United States Patent
Yi et al.

(10) Patent No.: US 10,069,557 B2
(45) Date of Patent: Sep. 4, 2018

(54) COMMUNICATION METHOD AND DEVICE

(71) Applicant: Huawei Device Co., Ltd., Shenzhen (CN)

(72) Inventors: Qiang Yi, Beijing (CN); Guowei Ouyang, Beijing (CN); Hui Jin, Beijing (CN)

(73) Assignee: Huawei Device (Shenzhen) Co., Ltd., Shenzhen (CN)

( * ) Notice: Subject to any disclaimer, the term of this patent is extended or adjusted under 35 U.S.C. 154(b) by 81 days.

(21) Appl. No.: 15/256,334

(22) Filed: Sep. 2, 2016

(65) Prior Publication Data

US 2016/0373183 A1    Dec. 22, 2016

Related U.S. Application Data

(63) Continuation of application No. PCT/CN2015/073665, filed on Mar. 4, 2015.

(30) Foreign Application Priority Data

Mar. 5, 2014    (CN) .......................... 2014 1 0079491

(51) Int. Cl.
*H04B 7/14* (2006.01)
*H04W 4/00* (2018.01)
(Continued)

(52) U.S. Cl.
CPC .............. *H04B 7/14* (2013.01); *H04W 4/005* (2013.01); *H04W 4/008* (2013.01); *H04W 4/70* (2018.02);
(Continued)

(58) Field of Classification Search
CPC ....... H04W 4/00; H04W 4/005; H04W 4/008; H04W 4/06; H04W 40/22; H04W 76/02;
(Continued)

(56) References Cited

U.S. PATENT DOCUMENTS

2006/0268823 A1   11/2006   Kim et al.
2007/0133455 A1    6/2007   Kuchibhotla et al.
(Continued)

FOREIGN PATENT DOCUMENTS

CN          1859257 A     11/2006
CN       101496421 A      7/2009
(Continued)

OTHER PUBLICATIONS

Intel; "Solution for Public Safety UE-to-Network Relays"; SA WG2 Meeting #S2-98; S2-132432; Valencia, Spain, Jul. 15-19, 2013; 8 pages.
(Continued)

*Primary Examiner* — Tri H Phan

(57) ABSTRACT

Embodiments of the present invention provide a communication method and a device, and relate to the communications field, to implement communication between a relay terminal and a remote terminal of a different communication group. The method includes: receiving, by a first terminal, a first message sent by a second terminal; when it is determined that the second terminal selects the first terminal as a relay terminal, acquiring group information corresponding to a communication group; and communicating with the second terminal according to the group information. The method embodiment is used to implement communication.

11 Claims, 9 Drawing Sheets

(51) Int. Cl.
*H04W 40/22* (2009.01)
*H04W 76/10* (2018.01)
*H04W 76/14* (2018.01)
*H04W 4/70* (2018.01)
*H04W 4/80* (2018.01)
*H04W 88/04* (2009.01)
*H04W 76/02* (2009.01)

(52) U.S. Cl.
CPC ............ *H04W 4/80* (2018.02); *H04W 40/22* (2013.01); *H04W 76/023* (2013.01); *H04W 76/14* (2018.02); *H04W 88/04* (2013.01)

(58) Field of Classification Search
CPC ..... H04W 76/023; H04W 88/04; H04W 4/70; H04W 4/80; H04W 76/10; H04W 76/14; H04B 7/14
See application file for complete search history.

(56) References Cited

U.S. PATENT DOCUMENTS

| | | | |
|---|---|---|---|
| 2011/0117844 A1 | 5/2011 | Fujita | |
| 2013/0272195 A1 | 10/2013 | Chu et al. | |
| 2014/0024384 A1 | 1/2014 | Lee et al. | |
| 2015/0029866 A1* | 1/2015 | Liao | H04W 4/008 370/241 |
| 2015/0382159 A1* | 12/2015 | Kim | H04W 4/08 370/312 |
| 2016/0057604 A1* | 2/2016 | Luo | H04W 8/005 370/330 |
| 2016/0095022 A1* | 3/2016 | Jin | H04W 36/38 455/438 |
| 2016/0135203 A1* | 5/2016 | Kim | H04W 48/20 370/315 |
| 2016/0150373 A1* | 5/2016 | Kim | H04B 7/026 455/456.3 |
| 2016/0197927 A1* | 7/2016 | Ma | H04W 4/90 726/4 |
| 2016/0198516 A1* | 7/2016 | Kim | H04W 76/14 370/312 |
| 2016/0234806 A1* | 8/2016 | Le Thierry D'Ennequin | H04W 4/06 |
| 2016/0286459 A1* | 9/2016 | Enomoto | H04W 8/005 |
| 2016/0360563 A1* | 12/2016 | Lecroart | H04W 76/022 |
| 2017/0013578 A1* | 1/2017 | Wei | H04W 8/005 |
| 2018/0103454 A1* | 4/2018 | Le Thierry D'Ennequin | H04W 76/14 |

FOREIGN PATENT DOCUMENTS

| | | |
|---|---|---|
| CN | 102469015 A | 5/2012 |
| CN | 103036937 A | 4/2013 |
| WO | 2013010242 A1 | 1/2013 |
| WO | 2013131234 A1 | 9/2013 |
| WO | 2013167206 A1 | 11/2013 |

OTHER PUBLICATIONS

Samsung; "Discussion on Relay Functionality for D2D Group Communication"; 3GPP TSG RAN WG1 Meeting #74; R1-133118; Barcelona, Spain; Aug. 19-23, 2013; 2 pages.

"3rd Generation Partnership Project; Technical Specifications Group Services and System Aspects; Service Requirements for the Evolved Packet System (EPS) (Release 12)"; 3GPP TS 22.278 V12.4.0; Sep. 2013; 45 pages.

"3rd Generation Partnership Project; Technical Specifications Group Services and System Aspects; Group Communication System Enablers for LTE (GCSE_LTE) (Release 12)"; 3GPP TS 22.468 V12.0.0; Jun. 2013; 22 pages.

"3rd Generation Partnership Project; Technical Specifications Group Services and System Aspects; Study on Architecture Enhancements to Support Proximity-Based Services (ProSe) (Release 12)"; 3GPP TR 23.703 V1.1.0; Jan. 2014; 324 pages.

Wu, S.; "Performance Analysis for Relay-based Device-to-Device Communication System in LTE Networks"; Master's Thesis submitted to Nanjing University of Posts and Telecommunications for the degree of Master of Engineering; Apr. 2013; 64 pages.

* cited by examiner

COMMUNICATION METHOD AND DEVICE

CROSS-REFERENCE TO RELATED APPLICATIONS

This application a continuation of International Application No. PCT/CN2015/073665, filed on Mar. 4, 2015, which claims priority to Chinese Patent Application No. 201410079491.3, filed on Mar. 5, 2014, both of which are hereby incorporated by reference in their entireties.

TECHNICAL FIELD

The present invention relates to the communications field, and in particular, to a communication method and a device.

BACKGROUND

In a conventional mobile communications network, a core network entity needs to be used when a terminal performs data communication. Therefore, when the terminal loses network coverage, the terminal cannot access the network to implement communication. By using a ProSe (Proximity Services, proximity services) technology, two terminals can implement device-to-device short range communication without using a core network entity. In this way, a terminal within network coverage may implement, by using the ProSe technology, short range communication with a terminal losing network coverage, thereby implementing a function of a relay terminal. In the prior art, a relay terminal may provide a relay service for a group of remote terminals. When data is sent over a network to a remote terminal losing network coverage, data transmission efficiency can be improved in a multicast manner. In this case, data exchange between the relay terminal and the remote terminal is implemented in a broadcast or multicast manner, so that the relay terminal can relay and forward data for a group of remote terminals in a group communication manner. Therefore, the remote terminal losing network coverage can receive network data by using a relay function of the relay terminal within network coverage.

However, if a relay terminal selected by a remote terminal is not in a same communication group as the remote terminal, the relay terminal does not have information about a communication group to which the remote terminal belongs. Therefore, the relay terminal cannot implement broadcast or multicast communication with the remote terminal, and further cannot relay or forward data for the remote terminal.

SUMMARY

Embodiments of the present invention provide a communication method and a device, to implement communication between a relay terminal and a remote terminal that belongs to a different communication group from the relay terminal.

To achieve the foregoing objective, the following technical solutions are used in the embodiments of the present invention:

According to a first aspect, a communication method is provided, including:

receiving, by a first terminal, a first message sent by a second terminal, where the first message is used to request a relay service, the second terminal is a member of a communication group, and the first terminal is a terminal having a relay function;

when the first terminal determines that the second terminal selects the first terminal as a relay terminal, if the first terminal is not a member of the communication group, acquiring, by the first terminal, group information corresponding to the communication group; and communicating, by the first terminal, with the second terminal according to the group information.

With reference to the first aspect, in a first possible implementation manner of the first aspect, the first message includes identity information of the communication group;

before the acquiring, by the first terminal, group information corresponding to the communication group, the method further includes:

determining, by the first terminal according to the identity information of the communication group, whether the first terminal is a member of the communication group; and the acquiring, by the first terminal, group information corresponding to the communication group includes:

when determining that the first terminal is not a member of the communication group, acquiring, by the first terminal, the group information corresponding to the communication group.

With reference to the first aspect or the first possible implementation manner of the first aspect, in a second possible implementation manner, the acquiring, by the first terminal, group information corresponding to the communication group includes:

sending, by the first terminal, a first request message including the identity information of the communication group to a proximity services ProSe server that serves the first terminal, so that the ProSe server sends the group information corresponding to the communication group to the first terminal according to the identity information of the communication group.

With reference to the second possible implementation manner of the first aspect, in a third possible implementation manner, the sending, by the first terminal, a first request message including the identity information of the communication group to a proximity services ProSe server that serves the first terminal, so that the ProSe server sends the group information corresponding to the communication group to the first terminal according to the identity information of the communication group includes:

sending, by the first terminal, the first request message including the identity information of the communication group to the ProSe server that serves the first terminal, so that the ProSe server sends, according to the first request message, a second request message to a group server of the communication group corresponding to the identity information of the communication group, and after receiving the group information that is sent by the group server to the ProSe server according to the second request message, sends the group information to the first terminal, where the second request message is used to request the group information corresponding to the communication group.

With reference to the first aspect or the first possible implementation manner of the first aspect, in a fourth possible implementation manner, the acquiring, by the first terminal, group information corresponding to the communication group includes:

receiving, by the first terminal, the group information that is corresponding to the communication group and that is sent by a group server corresponding to the communication group.

With reference to the fourth possible implementation manner of the first aspect, in a fifth possible implementation manner, after the first terminal determines that the second terminal selects the first terminal as the relay terminal, the method further includes:

sending, by the first terminal, a third request message to the home group server of the communication group, so that when determining that the first terminal is not a member of the communication group, the group server sends the group information corresponding to the communication group to the first terminal.

With reference to the fourth possible implementation manner of the first aspect, in a sixth possible implementation manner, before the receiving, by the first terminal, the group information that is corresponding to the communication group and that is sent by a group server corresponding to the communication group, the method further includes:

after receiving a fourth request message sent by the second terminal, sending, by the first terminal according to the fourth request message, a fifth request message to the group server corresponding to the communication group, so that when determining, according to the fifth request message, that the first terminal is not a member of the communication group, the group server sends the group information corresponding to the communication group to the first terminal, where the fifth request message includes identity information of the first terminal.

With reference to any one of the second to sixth possible implementation manners of the first aspect, in a seventh possible implementation manner, the group information includes communication resource information of the communication group.

With reference to the seventh possible implementation manner of the first aspect, in an eighth possible implementation manner, the group information further includes at least one of a Media Access Control MAC address of the communication group, an inter-network interconnection protocol IP address of the communication group, and security key information.

With reference to the first aspect or the first possible implementation manner of the first aspect, in a ninth possible implementation manner, the group information corresponding to the communication group includes communication resource information:

before the acquiring group information corresponding to the communication group, the method further includes:

sending a sixth request message to a mobility management entity MME, so that the MME sends a seventh request message to a base station according to the sixth request message, to instruct the base station to allocate the communication resource information to the first terminal;

the acquiring, by the first terminal, group information corresponding to the communication group includes:

receiving, by the first terminal, the communication resource information allocated by the base station;

after the acquiring, by the first terminal, group information corresponding to the communication group, the method further includes:

sending, by the first terminal, the communication resource information to the second terminal; and the communicating, by the first terminal, with the second terminal according to the group information includes:

communicating, by the first terminal, with the second terminal according to the communication resource information.

With reference to any one of the first aspect to the ninth possible implementation manner of the first aspect, in a tenth possible implementation manner, the group information further includes verification information;

after the acquiring, by the first terminal, group information corresponding to the communication group, the method further includes:

generating, by the first terminal, the verification information or obtaining the verification information according to the group information, and verifying the second terminal according to the verification information; and the communicating, by the first terminal, with the second terminal according to the group information includes:

after the second terminal is successfully verified according to the verification information, communicating, by the first terminal, with the second terminal.

According to a second aspect, a communication method is provided, including:

after a first terminal receives a first message sent by a second terminal, receiving, by a proximity services ProSe server, a first request message sent by the first terminal, where the first message is used to request a relay service, the second terminal is a member of a communication group, the first message includes identity information of the communication group, and the first request message is used to instruct the ProSe server to send group information corresponding to the communication group to the first terminal; and sending the group information to the first terminal according to the first request message, so that the first terminal communicates with the second terminal according to the group information.

With reference to the second aspect, in a first possible implementation manner of the second aspect, the sending the group information to the first terminal according to the first request message includes:

sending, according to the first request message, a second request message to a home group server of the communication group to which the second terminal belongs, so that the group server sends the group information to the ProSe server; and receiving the group information sent by the group server, and sending the group information to the first terminal.

With reference to the second aspect or the first possible implementation manner of the second aspect, in a second possible implementation manner, the group information includes communication resource information of the communication group.

With reference to the second possible implementation manner of the second aspect, in a third possible implementation manner, the group information further includes at least one of a Media Access Control MAC address of the communication group, an inter-network interconnection protocol IP address of the communication group, and security key information.

According to a third aspect, a terminal is provided, including:

an acquiring unit, configured to receive a first message sent by a second terminal; and when it is determined that the second terminal selects the first terminal as a relay terminal, if the first terminal is not a member of the communication group, acquire group information corresponding to the communication group, where the first message is used to request a relay service, the second terminal is a member of the communication group, and the first terminal is a terminal having a relay function; and a processing unit, configured to communicate with the second terminal according to the group information obtained by the acquiring unit.

With reference to the third aspect, in a first possible implementation manner, the first message includes identity information of the communication group;

the processing unit is further configured to determine, according to the identity information of the communication group, whether the first terminal is a member of the communication group; and the acquiring unit is specifically configured to: when the processing unit determines that the first terminal is not a member of the communication group, acquire the group information corresponding to the communication group.

With reference to the third aspect or the first possible implementation manner of the third aspect, in a second possible implementation manner, the terminal further includes:

a first sending unit, configured to send a first request message including the identity information of the communication group to a proximity services ProSe server that serves the first terminal, so that the ProSe server sends the group information corresponding to the communication group to the first terminal according to the identity information of the communication group.

With reference to the second possible implementation manner of the third aspect, in a third possible implementation manner, the first sending unit is further configured to send the first request message including the identity information of the communication group to the ProSe server that serves the first terminal, so that the ProSe server sends, according to the first request message, a second request message to a group server of the communication group corresponding to the identity information of the communication group, and after receiving the group information that is sent by the group server to the ProSe server according to the second request message, sends the group information to the first terminal, where the second request message is used to request the group information corresponding to the communication group.

With reference to the third aspect or the first possible implementation manner of the third aspect, in a fourth possible implementation manner, that the acquiring unit is configured to acquire group information corresponding to the communication group is specifically: the acquiring unit is configured to receive the group information that is corresponding to the communication group and that is sent by a group server corresponding to the communication group.

With reference to the fourth possible implementation manner of the third aspect, in a fifth possible implementation manner, the terminal further includes:

a second sending unit, configured to send a third request message to the home group server of the communication group, so that when determining that the first terminal is not a member of the communication group, the group server sends the group information corresponding to the communication group to the first terminal.

With reference to the fourth possible implementation manner of the third aspect, in a sixth possible implementation manner, the acquiring unit is further configured to receive a fourth request message sent by the second terminal; and the terminal further includes a third sending unit, configured to: after the acquiring unit receives the fourth request message sent by the second terminal, send, according to the fourth request message, a fifth request message to the group server corresponding to the communication group, so that when determining, according to the fifth request message, that the first terminal is not a member of the communication group, the group server sends the group information corresponding to the communication group to the first terminal, where the fifth request message includes identity information of the first terminal.

With reference to the second to sixth possible implementation manners of the third aspect, in a seventh possible implementation manner, the group information includes communication resource information of the communication group.

With reference to the seventh possible implementation manner of the third aspect, in an eighth possible implementation manner, the group information further includes at least one of a Media Access Control MAC address of the communication group, an inter-network interconnection protocol IP address of the communication group, and security key information.

With reference to the third aspect or the first possible implementation manner of the third aspect, in a ninth possible implementation manner, the group information corresponding to the communication group includes communication resource information;

the terminal further includes a fourth sending unit, configured to send a sixth request message to a mobility management entity MME, so that the MME sends a seventh request message to a base station according to the sixth request message, to instruct the base station to allocate the communication resource information to the terminal;

that the acquiring unit is configured to acquire group information corresponding to the communication group is specifically: the acquiring unit is configured to receive the communication resource information allocated by the base station;

the fourth sending unit is further configured to send the communication resource information to the second terminal; and that the processing unit is configured to communicate with the second terminal according to the group information obtained by the acquiring unit is specifically: the processing unit is configured to communicate with the second terminal according to the communication resource information.

With reference to any one of the third aspect to the ninth possible implementation manner of the third aspect, in a tenth possible implementation manner, the group information further includes verification information; and the processing unit is further configured to: after the acquiring unit acquires the group information corresponding to the communication group, generate the verification information or obtain the verification information according to the group information; verify the second terminal according to the verification information; and after the second terminal is successfully verified according to the verification information, communicate with the second terminal.

According to a fourth aspect, a proximity services ProSe server is provided, including:

an acquiring unit, configured to: after a first terminal receives a first message sent by a second terminal, receive a first request message sent by the first terminal, where the first message is used to request a relay service, the second terminal is a member of a communication group, the first message includes identity information of the communication group, and the first request message is used to instruct the ProSe server to send group information corresponding to the communication group to the first terminal;

a group information acquiring unit, configured to obtain, according to the first request message, the group information corresponding to the communication group; and a sending unit, configured to send the group information obtained by the group information acquiring unit to the first terminal according to the first request message, so that the first terminal communicates with the second terminal according to the group information.

With reference to the fourth aspect, in a first possible implementation manner, the sending unit is specifically configured to send a second request message to a home group server of the home communication group of the second terminal according to the first request message, so that the group server sends the group information to the ProSe server;

the group information acquiring unit is specifically configured to receive the group information sent by the group server; and the sending unit is further specifically configured to send the group information received by the group information acquiring unit to the first terminal.

With reference to the fourth aspect or the first possible implementation manner of the fourth aspect, in a second possible implementation manner, the group information includes communication resource information of the communication group.

With reference to the second possible implementation manner of the fourth aspect, in a third possible implementation manner, the group information further includes at least one of a Media Access Control MAC address of the communication group, an inter-network interconnection protocol IP address of the communication group, and security key information.

According to the foregoing solutions, a first terminal receives a first message sent by a second terminal; and when determining that the second terminal selects the first terminal as a relay terminal, if the first terminal is not a member of a communication group to which the second terminal belongs, the first terminal acquires group information corresponding to the communication group, and communicates with the second terminal according to the group information. In this way, when the first terminal and the second terminal are not in a same communication group, the first terminal may acquire, from a network, the group information of the communication group to which the second terminal belongs, and implement communication with the second terminal according to the group information, thereby implementing communication between a relay terminal (the first terminal) and a remote terminal (the second terminal) that belongs to a communication group different from that of the relay terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

It should be understood that terms "first", "second", "third", and the like may be used to describe messages, requests, and terminals in the embodiments of the present invention, but these messages, requests, and terminals are not limited to these terms. These terms are merely used to distinguish messages, requests, and terminals. For example, without departing from the scope of the embodiments of the present invention, a first terminal may also be referred to as a second terminal, and similarly, a second terminal may also be referred to a first terminal.

A context is depended on. For example, the term "if" used herein may be explained as "during" or "when" or "response to determining" or "response to detection". Similarly, depending on a context, a phrase "if determining" or "if detecting" (a stated condition or event) may be explained as "when determining", or "response to determining", or "when detecting (the stated condition or event", or "response to detecting" (the stated condition or event).

Figure 1:
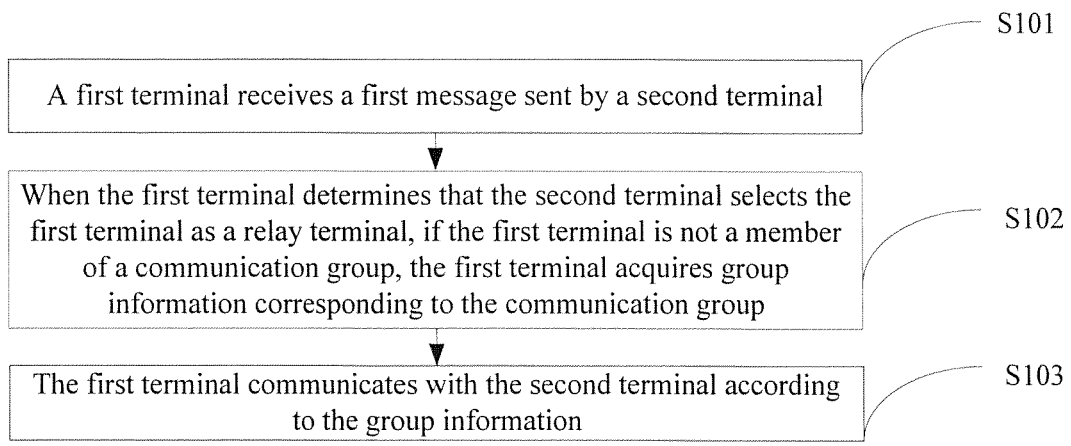
FIG. 1 is a schematic flowchart of a communication method according to an embodiment of the present invention.

An embodiment of the present invention provides a communication method. As shown in FIG. 1, the method is executed by a first terminal. The method includes:

S101: A first terminal receives a first message sent by a second terminal.

The second terminal is a member of a communication group, where members in the communication group may implement communication in a group communication manner. The first message is used to request a relay service. The first terminal is a terminal having a relay function.

Specifically, if the second terminal loses network coverage, the second terminal sends the first message in a broadcast manner, so as to search for a terminal within network coverage and use the terminal as a relay terminal; the first terminal listens to and obtains the first message broadcast by the second terminal, where the first terminal is within network coverage and has a relay capability.

For example, the first terminal is a mobile phone 1, and the second terminal is a mobile phone 2. If the mobile phone 2 cannot access a communications network due to a relatively weak signal, the mobile phone 2 sends a first message in a broadcast manner. The mobile phone 1 is within network coverage, and therefore can normally access the communications network. The mobile phone 1 listens to and obtains the first message.

It should be noted that "first", "second", and the like described in this embodiment of the present invention are not intended to limit a sequence and are merely for easy distinguishing.

S102: When the first terminal determines that the second terminal selects the first terminal as a relay terminal, if the first terminal is not a member of the communication group, the first terminal acquires group information corresponding to the communication group.

Specifically, after the second terminal determines to select the first terminal as the relay terminal, the first terminal receives a notification message or an IP address request message that is sent by the second terminal, and determines, according to the notification message or the IP (Internet Protocol, inter-network interconnection protocol) address request message, that the second terminal selects the first terminal as the relay terminal.

Further, the first message includes identity information of the communication group. The first terminal determines, according to the identity information of the communication group, whether the first terminal is a member of the communication group; when the first terminal determines that the first terminal is not a member of the communication group, the first terminal acquires the group information corresponding to the communication group.

Specifically, the first message includes the identity information of the communication group. After receiving the first message sent by the second terminal, the first terminal obtains the identity information according to the first message. The first terminal saves identity information of a home communication group of the first terminal, and when determining that the identity information of the communication group to which the second terminal belongs is different from the identity information of the communication group to which the first terminal belongs, determines that the first terminal is not a member of the communication group.

Further, the first terminal may acquire the group information corresponding to the communication group in the following three implementation manners.

Manner 1: The first terminal sends a first request message including the identity information of the communication group to a ProSe (Proximity Services, proximity services) server that serves the first terminal, so that the ProSe server obtains the identity information of the communication group according to the first request message, and sends the group information to the first terminal according to the identity information of the communication group.

In the following embodiments of the present invention, the ProSe server that serves the first terminal refers to a ProSe server that serves the first terminal and that is in a home network of the first terminal.

Further, after the first terminal sends the first request message to the ProSe server, the ProSe server may verify, according to subscription information saved by the ProSe server, whether the first terminal can be used as the relay terminal of the communication group to which the second terminal belongs; and if the verification fails, send a verification failure message to the first terminal, and terminate the process; or if the verification is successful, determine that the first terminal can be used as the relay terminal of the second terminal, and send the group information to the first terminal, where the first request message may be a verification request message including an indication for requesting group information, or a request message for requesting group information.

Specifically, if the group information is configured in the ProSe server, the ProSe server may directly send the group information to the first terminal.

Optionally, the first terminal sends the first request message including the identity information of the communication group to the ProSe server that serves the first terminal, so that the ProSe server sends, according to the first request message, a second request message to a group server of the communication group corresponding to the identity information of the communication group, and after receiving the group information that is sent by the group server to the ProSe server according to the second request message, sends the group information to the first terminal, where the second request message is used to request the group information corresponding to the communication group.

Specifically, after the verification performed by the ProSe server according to the subscription information saved in the ProSe server is successful, if no group information is configured in the ProSe server, the ProSe server sends the second request message including the identity information to the home group server of the communication group according to the first request message, and after receiving the group information that is sent by the group server to the ProSe server according to the identity information, sends the group information to the first terminal.

The proximity services server ProSe Server may also be referred to as ProSe Function or PDCF (Proximity Discovery and Communication control Functionality), and is an entity, on a network side, for managing subscription information of a ProSe service and performing verification.

Manner 2: The first terminal receives the group information that is corresponding to the communication group and that is sent by a group server corresponding to the communication group.

Specifically, the first terminal sends a third request message to the home group server of the communication group, so that when determining that the first terminal is not a member of the communication group, the group server sends the group information corresponding to the communication group to the first terminal.

The third request message may be a registration request, verification request, or notification message that is sent by the first terminal. The message type is not limited in the present invention.

Optionally, before the first terminal receives the group information that is corresponding to the communication group and that is sent by the group server corresponding to the communication group, after receiving a fourth request message sent by the second terminal, the first terminal sends, according to the fourth request message, a fifth request message to the group server corresponding to the communication group, so that when determining, according to the fifth request message, that the first terminal is not a member of the communication group, the group server sends the group information corresponding to the communication group to the first terminal.

The fifth request message includes identity information of the first terminal.

Specifically, the fourth request message may be a verification request message sent by the second terminal to the corresponding group server. After receiving the fourth request message, the first terminal sends the fifth request message to the group server according to the fourth request message, where the fifth request message includes the identity information of the first terminal, so that the group server verifies the second terminal after receiving the fifth request message, after the verification is successful, further determines whether the first terminal is a group member, and sends the group information to the first terminal when the first terminal is not a group member. The fourth request message and the fifth request message may be same messages or may be different messages.

It should be noted that, in the foregoing manner 1 and manner 2, the group information includes communication resource information of the communication group. In addition, the group information may further include at least one of a MAC (Media Access Control, Media Access Control) address of the communication group, an IP address of the communication group, and security key information.

Further, when the first terminal acquires the group information in a manner 3, the group information is only communication resource information.

Manner 3: The first terminal sends a sixth request message to an MME (Mobility Management Entity, mobility management entity), so that the MME sends a seventh request message to a base station according to the sixth request message, to instruct the base station to allocate the communication resource information to the first terminal; the first terminal receives the communication resource information allocated by the base station, and after receiving the communication resource information allocated by the base station, sends the communication resource information to the second terminal.

Specifically, the sixth request message may be a communication resource request message. After receiving the sixth request message, the MME verifies whether the first terminal can be used as the relay terminal of the communication group to which the second terminal belongs. The MME may send a verification request message to a ProSe server, so that the ProSe server performs verification on the first terminal.

Optionally, the MME may send a verification request message to a group server, where the verification request message includes identity information of the first terminal and the identity information of the communication group to which the second terminal belongs, so that the group server performs verification on the first terminal.

Further, after the verification is successful, the MME sends a resource allocation instruction to the base station, to instruct the base station to allocate a communication resource. The first terminal receives the communication resource information sent by the base station, and sends the communication resource information to the second terminal.

S103: The first terminal communicates with the second terminal according to the group information.

Further, before the first terminal communicates with the second terminal according to the group information, the first terminal sends verification information to the second terminal, to verify the second terminal.

Specifically, the group information further includes the verification information. After the first terminal acquires the group information corresponding to the communication group, the first terminal generates the verification information, or obtains the verification information according to the group information, and verifies the second terminal according to the verification information. After the second terminal is successfully verified according to the verification information, the first terminal communicates with the second terminal.

Further, after the second terminal is successfully verified, the first terminal establishes communication with the second terminal according to the group information.

Specifically, the first terminal may implement communication with the second terminal according to the communication resource information, and may further protect communication between the first terminal and the second terminal according to the security key information.

Further, if the first terminal can implement communication with the second terminal, the first terminal can be used as the relay terminal of the second terminal, thereby implementing information exchange between the second terminal and a communications network.

According to the foregoing solution, a first terminal receives a first message sent by a second terminal; and when determining that the second terminal selects the first terminal as a relay terminal, if the first terminal is not a member of a communication group to which the second terminal belongs, the first terminal acquires group information corresponding to the communication group, and communicates with the second terminal according to the group information. In this way, when the first terminal and the second terminal are not in a same communication group, the first terminal may acquire, from a network, the group information of the communication group to which the second terminal belongs, and implement communication with the second terminal according to the group information, thereby implementing communication between a relay terminal (the first terminal) and a remote terminal (the second terminal) that belongs to a communication group different from that of the relay terminal.

Figure 2:
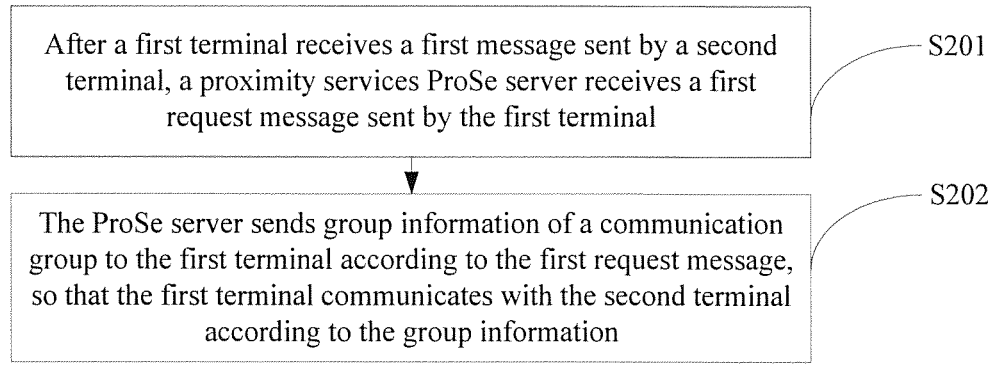
FIG. 2 is a schematic flowchart of another communication method according to an embodiment of the present invention.

An embodiment of the present invention provides a communication method. As shown in FIG. 2, the method is executed by a ProSe (Proximity Services, proximity services) server. The method includes:

S201: After a first terminal receives a first message sent by a second terminal, the proximity services ProSe server receives a first request message sent by the first terminal.

The first message is used to request a relay service, the second terminal is a member of a communication group, the first message includes identity information of the communication group, and the first request message is used to instruct the ProSe server to send group information corresponding to the communication group to the first terminal.

Specifically, if the second terminal loses network coverage, the second terminal may send the first message in a broadcast manner, so as to search for a terminal within network coverage and use the terminal as a relay terminal. After listening to and obtaining the first message broadcast by the second terminal, the first terminal sends the first request message including the identity information to the ProSe server. The ProSe server receives the first request message sent by the first terminal, where the first terminal is within network coverage and has a relay capability, and the first terminal is served by the ProSe server.

For example, the first terminal is a mobile phone 1, and the second terminal is a mobile phone 2. If the mobile phone 2 cannot access a communications network due to a relatively weak signal, the mobile phone 2 sends a first message in a broadcast manner. The mobile phone 1 is within network coverage, and therefore can normally access the communications network. The mobile phone 1 receives the first message.

It should be noted that "first", "second", and the like described in this embodiment of the present invention are not intended to limit a sequence and are merely for easy distinguishing.

S202: The ProSe server sends group information of the communication group to the first terminal according to the first request message, so that the first terminal communicates with the second terminal according to the group information.

Further, after the first terminal sends the first request message to the ProSe server, the ProSe server may verify, according to subscription information saved in the ProSe server, whether the first terminal can be used as the relay terminal of the communication group to which the second terminal belongs; and if the verification fails, send a verification failure message to the first terminal, and terminate the process; or if the verification is successful, determine that the first terminal can be used as the relay terminal of the second terminal, and send the group information to the first terminal.

Specifically, after the first terminal is successfully verified by the ProSe server according to the subscription information, if the group information is configured in the ProSe server, the ProSe server may directly send the group information to the first terminal.

Optionally, the ProSe server sends a second request message to a home group server of the home communication group of the second terminal according to the first request message, so that the group server sends the group information to the ProSe server; receives the group information sent by the group server; and sends the group information to the first terminal.

Specifically, after the verification performed by the ProSe server according to the subscription information saved in the ProSe server is successful, if no group information is configured in the ProSe server, the ProSe server sends the second request message to the home group server of the communication group according to the first request message, so that the group server sends the group information to the ProSe server; and after receiving the group information that is sent by the group server according to the identity information, sends the group information to the first terminal.

It should be noted that the group information includes communication resource information of the communication group. In addition, the group information may further include at least one of a MAC (Media Access Control, Media Access Control) address of the communication group, an IP (Internet Protocol, inter-network interconnection protocol) address of the communication group, and security key information.

Further, the first terminal may implement communication with the second terminal according to the communication resource information, and protect communication between the first terminal and the second terminal according to the security key information.

Specifically, if the first terminal can implement communication with the second terminal, the first terminal can be used as the relay terminal, thereby implementing information exchange between the second terminal and a communications network.

According to the foregoing solution, after a first terminal receives a first message sent by a second terminal, a proximity services ProSe server receives a first request message sent by the first terminal, and sends group information to the first terminal according to the first request message, so that the first terminal communicates with the second terminal according to the group information. In this way, when the first terminal and the second terminal are not in a same communication group, the first terminal may acquire group information from a network, and implement communication with the second terminal according to the group information, thereby communicating with a terminal in a different user group.

Figure 3:
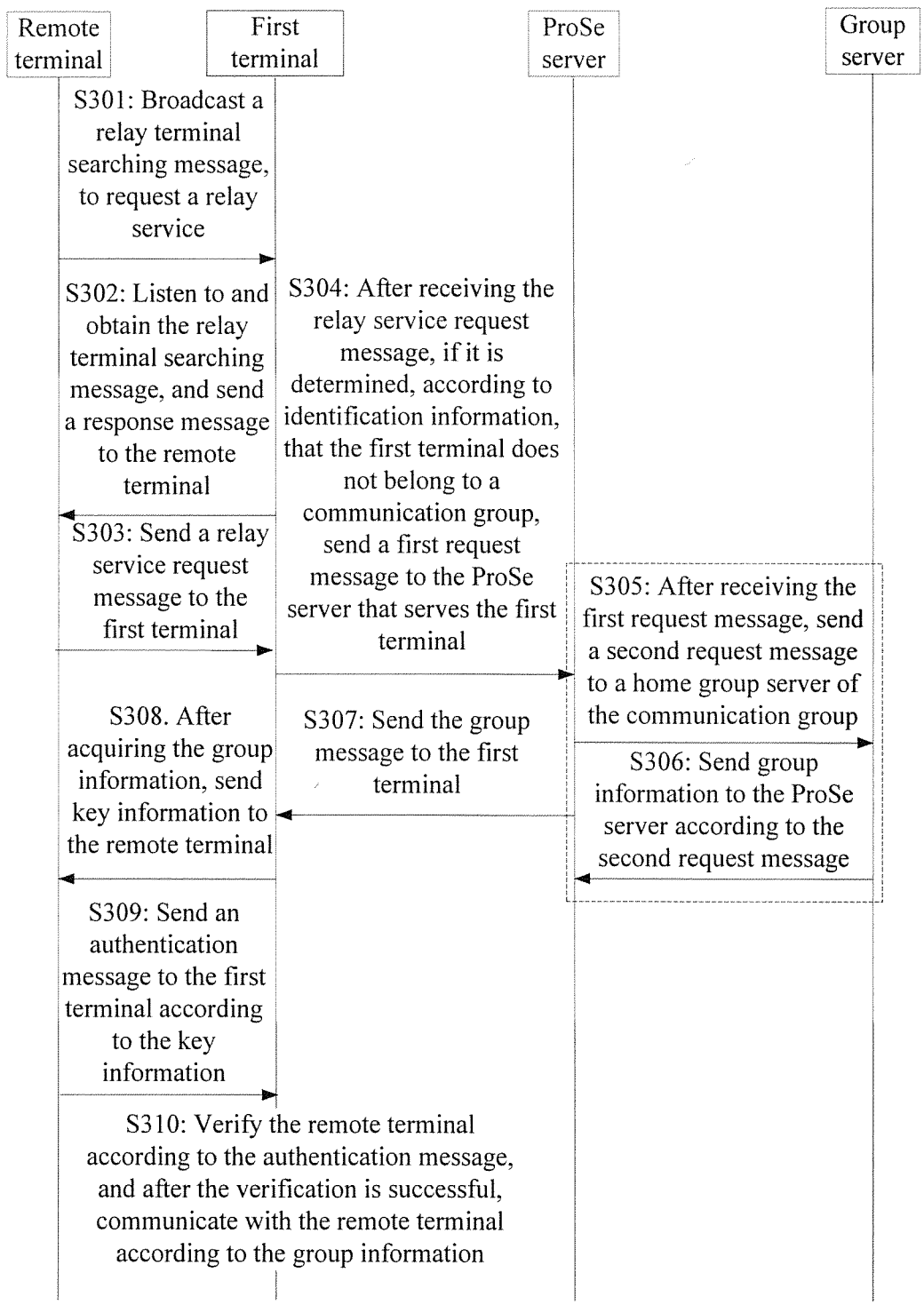
FIG. 3 is a schematic flowchart of another communication method according to an embodiment of the present invention.

An embodiment of the present invention provides a communication method. As shown in FIG. 3, the method includes:

S301: A remote terminal broadcasts a relay terminal searching message, to request a relay service.

The remote terminal loses network coverage, the remote terminal is a member of a communication group, and members of the communication group may communicate with each other in a group communication manner.

Specifically, the remote terminal loses the network coverage and cannot communicate with a network. Therefore, the remote terminal broadcasts a message, so as to search for a terminal within network coverage and use the terminal as a relay terminal. The relay terminal searching message may include identity information of the communication group to which the remote terminal belongs. The identity information may be in a form of group identity group ID (Identity, identity number), in a form of group ID and application identity, or the like.

S302: A first terminal listens to and obtains the relay terminal searching message, and sends a response message to the remote terminal.

The first terminal is within network coverage and can be used as a relay terminal.

Specifically, after receiving the relay terminal searching message sent by the remote terminal, the first terminal within network coverage sends the response message to the remote terminal, where the response message indicates that the first terminal can be used as the relay terminal.

It should be noted that "first", "second", and the like described in this embodiment of the present invention are not intended to limit a sequence and are merely for easy distinguishing.

S303: The remote terminal sends a relay service request message to the first terminal.

Specifically, after receiving at least one response message, if the remote terminal determines, according to a preset policy, to select the first terminal as the relay terminal, the remote terminal sends the relay service request message to the first terminal.

The preset policy may be: selecting a terminal that is corresponding to a response message with largest signal strength in the at least one response message as the relay terminal. The relay service request message may be a notification including indication information of selecting the first terminal as the relay terminal, or may be a request message, sent by the remote terminal, for acquiring an IP (Internet Protocol, inter-network interconnection protocol) address, so as to notify the first terminal that the remote terminal has selected the first terminal as the relay terminal to perform a relay service. A specific type of the message is not limited in the present invention.

It should be noted that a process of selecting the first terminal as the relay terminal by the remote terminal may also be: sending a relay service request message to the first terminal if the remote terminal listens to and obtains a signal broadcast by at least one terminal within network coverage, and determines, according to the preset policy, to select the first terminal as the relay terminal, which is not limited in this embodiment of the present invention.

In addition, the relay service request message sent by the remote terminal to the first terminal includes the identity information of the communication group to which the remote terminal belongs, which is not limited in this embodiment of the present invention.

S304: After receiving the relay service request message, if it is determined, according to the identity information, that the first terminal does not belong to the communication group, the first terminal sends a first request message to a ProSe (Proximity Services, proximity services) server that serves the first terminal.

Specifically, the first terminal saves in advance identity information of a group to which the first terminal belongs. After acquiring the identity information of the communication group, and when determining that the identity information of the communication group to which the remote terminal belongs is different from the identity information saved by the first terminal, the first terminal determines that the first terminal does not belong to the communication group to which the remote terminal belongs. Therefore, the first terminal sends the first request message to the ProSe server that serves the first terminal, to request group information of the communication group to which the remote terminal belongs, so as to facilitate communication with the remote terminal.

The first request message includes the identity information of the communication group, so that the ProSe server returns the group information according to the identity information of the communication group.

Specifically, the group information includes communication resource information of the communication group acquired from the network, and may further include one or more of a MAC (Media Access Control, Media Access Control) address of the communication group, an IP address of the communication group, and security key information. The security key information may be either or both of a security key used for group communication and a key used for verifying the remote terminal. The communication resource information may be information about a frequency band for sending and receiving group data.

S305: After receiving the first request message, the ProSe server sends a second request message to a home group server of the communication group.

Specifically, after determining, according to subscription information, that the first terminal can be used as the relay terminal of the communication group to which the remote terminal belongs, the ProSe server sends the second request message to the home group server of the communication group to which the remote terminal belongs, to request the group server to send the group information to the ProSe server.

S306: The group server sends group information to the ProSe server according to the second request message.

Specifically, the second request message may include the identity information of the communication group. After receiving the second request message sent by the ProSe server, the group server sends the corresponding group information to the ProSe server.

It should be noted that after receiving the first request message sent by the first terminal, the ProSe server may verify the first terminal according to the first request message, to verify whether the first terminal can be used as the relay terminal of the communication group to which the remote terminal belongs. The verification process may be completed by the ProSe server, or may be completed by the group server, which is not limited in this embodiment of the present invention.

It should be noted that, in the foregoing steps S305 and S306, the ProSe server requests the group information from the group server, and executes the following step S307 after receiving the group information. In addition, optionally, if the group information is preconfigured in the ProSe server, the ProSe server may directly determine the corresponding group information according to the identity information included in the first request message, and execute the following step S307.

S307: The ProSe server sends the group information to the first terminal.

Specifically, the ProSe server sends the group information to the first terminal according to the first request message.

S308. After acquiring the group information, the first terminal sends key information to the remote terminal.

The group information may include the key information. After receiving the group information, the first terminal acquires the key information according to the group information, and sends the key information to the remote terminal.

It should be noted that if the group information includes the key information, the first terminal may acquire the key information according to the group information. In addition, optionally, the first terminal may also generate the key information, which is not limited in this embodiment of the present invention.

S309: The remote terminal sends a verification message to the first terminal according to the key information.

After receiving the key information sent by the first terminal, the remote terminal sends the verification message to the first terminal according to the key information.

S310: The first terminal verifies the remote terminal according to the verification message, and after the verification is successful, communicates with the remote terminal according to the group information.

Specifically, the first terminal may verify the remote terminal according to information in the verification message that is sent by the remote terminal. After the remote terminal is successfully verified, the first terminal communicates with the remote terminal according to the group information.

Further, the first terminal allocates an IP address to the remote terminal, and after allocating the IP address to the remote terminal, implements communication between the remote terminal and the network by communicating with the remote terminal.

According to the foregoing solution, a first terminal receives a relay service request message sent by a remote terminal, acquires group information corresponding to a communication group when determining that the first terminal is not a member of the communication group, and communicates with the remote terminal according to the group information. In this way, when the first terminal and the remote terminal are not in a same communication group, the first terminal may acquire group information from a network, and therefore communicate with a terminal of a different communication group.

It should be noted that, for the foregoing method embodiment, for ease of description, the method embodiment is expressed as a combination of a series of actions, but a person skilled in the art should know that the present invention is not limited to the described action sequence. Next, a person skilled in the art should also know that the embodiments described in the specification are exemplary embodiments and the involved actions and modules are not necessarily mandatory for the present invention.

Figure 4:
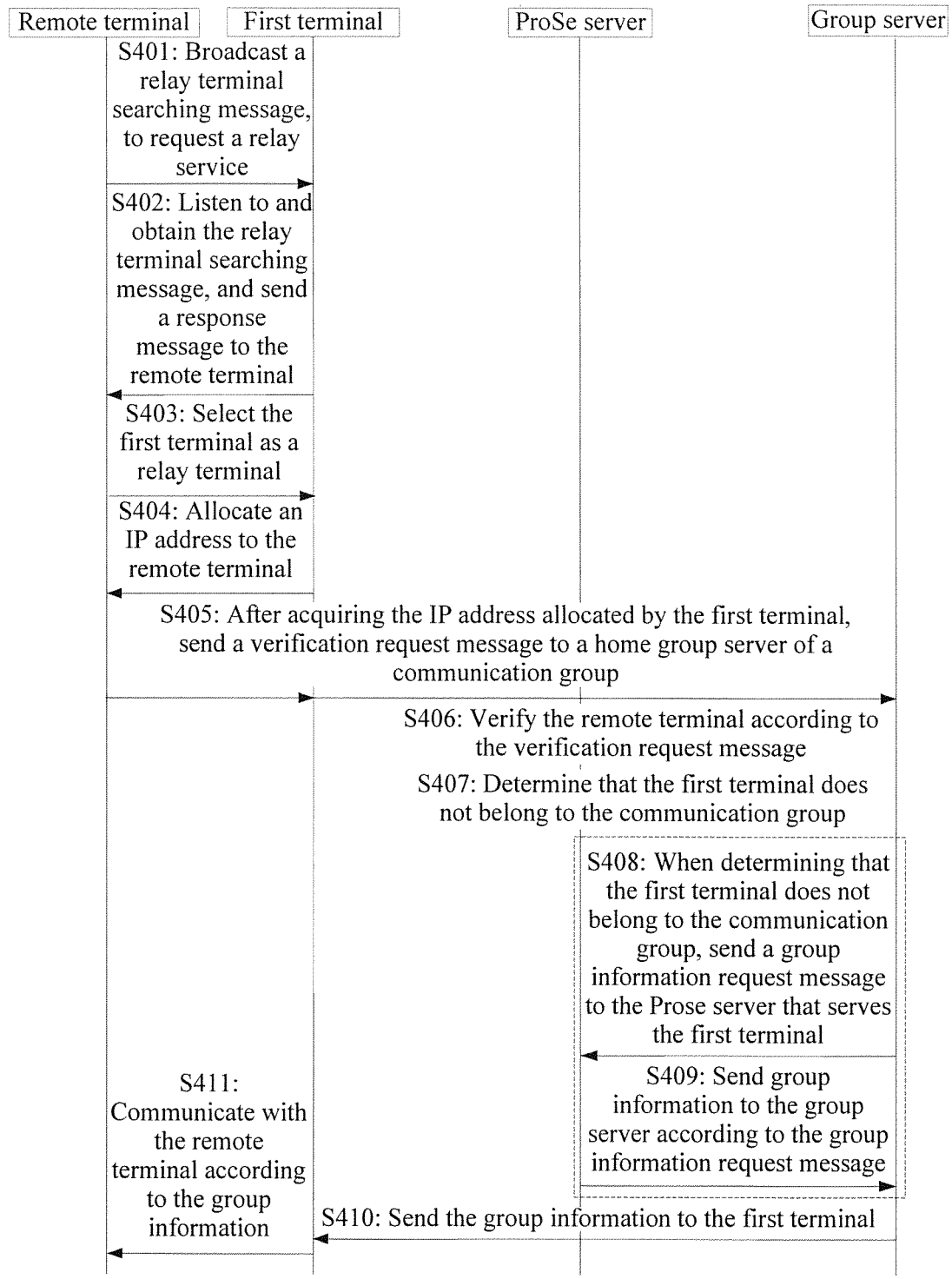
FIG. 4 is a schematic flowchart of another communication method according to an embodiment of the present invention.

An embodiment of the present invention provides a communication method. As shown in FIG. 4, the method includes:

S401: A remote terminal broadcasts a relay terminal searching message, to request a relay service.

The remote terminal loses network coverage, the remote terminal is a member of a communication group, and members of the communication group may communicate with each other in a group communication manner.

Specifically, the remote terminal loses the network coverage and cannot communicate with a network. Therefore, the remote terminal broadcasts a message, so as to search for a terminal within network coverage and use the terminal as a relay terminal.

S402: A first terminal listens to and obtains the relay terminal searching message, and sends a response message to the remote terminal.

The first terminal is within network coverage and can be used as a relay terminal.

Specifically, after receiving the relay terminal searching message sent by the remote terminal, the first terminal within network coverage sends the response message to the remote terminal, where the response message indicates that the first terminal can be used as the relay terminal.

The response message may further include identity information of the first terminal, for example, an MSISDN (Mobile Subscriber International ISDN (Integrated Service Digital Network, integrated service digital network)/PSTN (Public Switched Telephone Network, public switched telephone network) number, or a mobile user number.

It should be noted that "first", "second", and the like described in this embodiment of the present invention are not intended to limit a sequence and are merely for easy distinguishing.

S403: The remote terminal selects the first terminal as a relay terminal.

Specifically, after receiving at least one response message, the remote terminal determines, according to a preset policy, to select the first terminal as the relay terminal, and notifies the first terminal. The preset policy may be: selecting a terminal that is corresponding to a response message with largest signal strength in the at least one response message as the relay terminal.

It should be noted that a process of selecting the first terminal as the relay terminal by the remote terminal may also be: sending a relay service request message to the first terminal if the remote terminal listens to and obtains a signal broadcast by at least one terminal within network coverage, and determines, according to the preset policy, to select the first terminal as the relay terminal, which is not limited in this embodiment of the present invention. A signal broadcast by a terminal within network coverage may include identity information of the terminal, for example, an MSISDN.

S404: The first terminal allocates an IP (Internet Protocol, inter-network interconnection protocol) address to the remote terminal.

Specifically, after receiving an IP address allocation request (not shown in the figure) from the remote terminal, the first terminal may allocate the IP address to the remote terminal according to an existing IP address allocation process.

S405: After acquiring the IP address allocated by the first terminal, the remote terminal sends a verification request message to a home group server of a communication group.

The verification request message includes the identity information of the first terminal and identity information of the remote terminal, so that after verifying the remote terminal according to the identity information of the remote terminal, the group server further determines whether the first terminal is a member of the communication group to which the remote terminal belongs.

Specifically, the first terminal receives the verification request message sent by the remote terminal and directly forwards the verification request message to the group server, so that the group server verifies the remote terminal according to the identity information of the remote terminal, and after verifying the remote terminal, further determines whether the first terminal is a member of the communication group to which the remote terminal belongs.

Optionally, the first terminal receives a first verification request message sent by the remote terminal, and sends a second verification request message to the group server, where the second verification request message includes the identity information of the first terminal and the identity information of the remote terminal, so that the group server verifies the remote terminal according to the identity information of the remote terminal, and after verifying the remote terminal, further determines whether the first terminal is a member of the communication group to which the remote terminal belongs. The second verification request message may be the same as or may be different from the first verification request message. When the two are different, the second verification request message may be obtained according to the first verification request message.

S406: The group server verifies the remote terminal according to the verification request message.

Further, after the remote terminal is successfully verified according to the verification request message, the group server returns a verification response message to the remote terminal, to indicate that the verification performed on the remote terminal is successful. Corresponding to the foregoing two cases of step S405, when the remote terminal sends the verification request message to the group server by means of forwarding by the first terminal, the verification response message may be directly sent to the remote terminal or be forwarded to the remote terminal by the first terminal; when the remote terminal sends the first verification request message to the first terminal, so that the first terminal sends the second verification request message to the group server according to the first verification request message, the group server sends a second verification response message to the first terminal, so that the first terminal sends a first verification response message to the remote terminal according to the second verification response message, to indicate that the verification performed on the remote terminal is successful. A process of returning a verification response message to the remote terminal by the group server is not shown in the figure.

Specifically, the group server performs verification on the remote terminal, so as to determine that the remote terminal belongs to the communication group.

It should be noted that after determining that the remote terminal belongs to the communication group, the group server may further perform verification on the first terminal to verify whether the first terminal can be used as the relay terminal of the communication group to which the remote terminal belongs. The verification process may be completed by the group server, or may be completed by a ProSe (Proximity Services, proximity services) server, which is not limited in this embodiment of the present invention.

S407: The group server determines that the first terminal does not belong to the communication group.

Specifically, the group server determines, according to the identity information of the first terminal, whether the first terminal belongs to the communication group. When it is determined that the first terminal does not belong to the communication group, subsequent steps S408 to S410 are executed.

S408: When determining that the first terminal does not belong to the communication group, the group server sends a group information request message to a ProSe server that serves the first terminal.

Specifically, the group server sends the group information request message including identity information of the communication group to a home ProSe server of the first terminal.

S409: The ProSe server sends group information to the group server according to the group information request message.

Specifically, the group information request message includes the identity information of the communication group. After receiving the group information request message, the ProSe server sends group information corresponding to the identity information to the group server.

Optionally, if the group information is saved in the group server, the foregoing steps S408 and S409 may not be executed, and the following step S410 may be directly executed.

S410: The group server sends the group information to the first terminal.

The group information includes communication resource information of the communication group acquired from the network, and may further include one or more of a MAC (Media Access Control, Media Access Control) address of the communication group, an IP address of the communication group, and security key information. The security key information is a security key used for group communication. The communication resource information is information about a frequency band for sending and receiving group data.

It should be noted that the group server may send a data packet including the group information to the first terminal, or the group server may instruct the ProSe server that serves the first terminal to send the group information to the first terminal, which is not limited in this embodiment of the present invention.

It should be noted that, in this embodiment of the present invention, the group server may perceive the first terminal when the identity information of the first terminal is added at a time of sending the verification request message by the remote terminal to the group server, or when the first terminal is registered with or verified by the group server or sends a notification message to the group server, which is not limited in this embodiment of the present invention.

S411: The first terminal communicates with the remote terminal according to the group information.

Specifically, other steps of accessing, by the remote terminal, the network via the relay terminal are executed, and communication between the remote terminal and the network via the relay terminal is implemented according to obtained information. The group information includes the communication resource information. The first terminal may communicate with the remote terminal by using the communication resource information, and implement the communication between the remote terminal and the network by communicating with the remote terminal.

According to the foregoing solution, a first terminal receives a relay service request message sent by a remote terminal; and when determining that the first terminal is not a member of a communication group to which the remote terminal belongs, the first terminal acquires group information corresponding to the communication group, and communicates with the remote terminal according to the group information. In this way, when the first terminal and the remote terminal are not in a same communication group, the first terminal may acquire group information from a network, and therefore communicate with a terminal of a different communication group.

It should be noted that, for the foregoing method embodiment, for ease of description, the method embodiment is expressed as a combination of a series of actions, but a person skilled in the art should know that the present invention is not limited to the described action sequence. Next, a person skilled in the art should also know that the embodiments described in the specification are exemplary embodiments and the involved actions and modules are not necessarily mandatory for the present invention.

Figure 5:
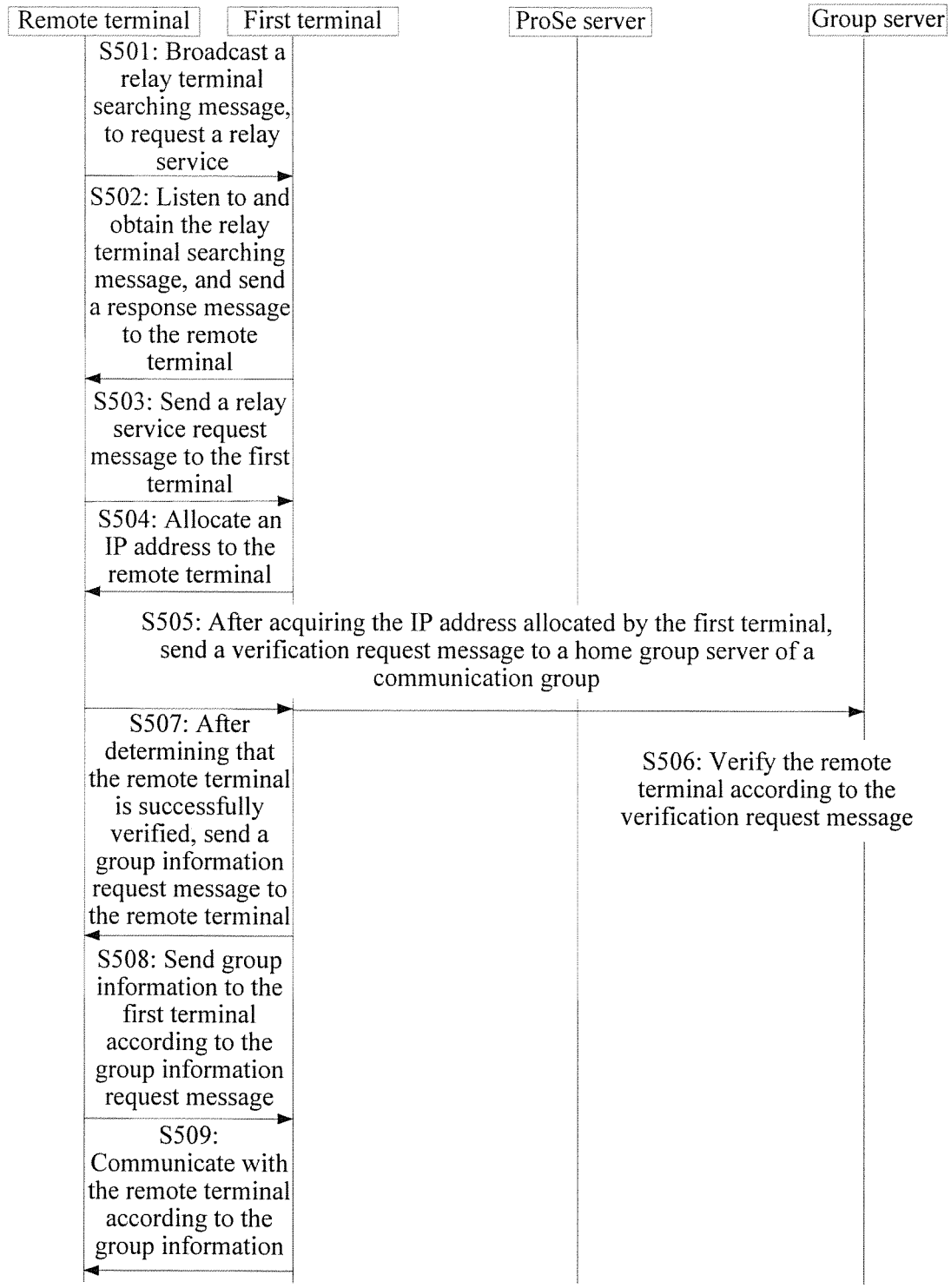
FIG. 5 is a schematic flowchart of another communication method according to an embodiment of the present invention.

An embodiment of the present invention provides a communication method. As shown in FIG. 5, the method includes:

S501: A remote terminal broadcasts a relay terminal searching message, to request a relay service.

The remote terminal loses network coverage, the remote terminal is a member of a communication group, and members of the communication group may communicate with each other in a group communication manner.

Specifically, the remote terminal loses the network coverage and cannot communicate with a network. Therefore, the remote terminal broadcasts a message, so as to search for a terminal within network coverage and use the terminal as a relay terminal.

S502: A first terminal listens to and obtains the relay terminal searching message, and sends a response message to the remote terminal.

The first terminal is within network coverage and can be used as a relay terminal.

Specifically, after receiving the relay terminal searching message sent by the remote terminal, the first terminal within network coverage sends the response message to the remote terminal, where the response message is used to notify the remote terminal that the first terminal can be used as the relay terminal.

It should be noted that "first", "second", and the like described in this embodiment of the present invention are not intended to limit a sequence and are merely for easy distinguishing.

S503: The remote terminal sends a relay service request message to the first terminal.

Specifically, after receiving at least one response message, if the remote terminal determines, according to a preset policy, to select the first terminal as the relay terminal, the remote terminal sends the relay service request message to the first terminal. The preset policy may be: selecting a terminal that is corresponding to a response message with largest signal strength in the at least one response message as the relay terminal. The relay service request message may be a notification including indication information of selecting the first terminal as the relay terminal, or may be a request message, sent by the remote terminal, for acquiring an IP (Internet Protocol, inter-network interconnection protocol) address, so as to notify the first terminal that the remote terminal has selected the first terminal as the relay terminal to perform a relay service. A specific type of the message is not limited in this embodiment of the present invention.

It should be noted that a process of selecting the first terminal as the relay terminal by the remote terminal may also be: sending a relay service request message to the first terminal if the remote terminal listens to and obtains a signal broadcast by at least one terminal within network coverage, and determines, according to the preset policy, to select the first terminal as the relay terminal, which is not limited in this embodiment of the present invention.

S504: The first terminal allocates an IP address to the remote terminal.

Specifically, after receiving an IP address allocation request from the remote terminal, the first terminal allocates the IP address to the remote terminal according to an existing IP address allocation process.

S505: After acquiring the IP address allocated by the first terminal, the remote terminal sends a verification request message to a home group server of a communication group.

The verification request message includes identity information of the first terminal and identity information of the remote terminal, so that after verifying the remote terminal according to the identity information of the remote terminal, the group server further determines whether the first terminal is a member of the communication group to which the remote terminal belongs.

Specifically, the first terminal receives the verification request message and directly forwards the verification request message to the group server, so that the group server verifies the remote terminal according to the identity information of the remote terminal, and after verifying the remote terminal, further determines whether the first terminal is a member of the communication group to which the remote terminal belongs.

Optionally, the first terminal receives a first verification request message sent by the remote terminal, and sends a second verification request message to the group server, where the second verification request message includes the identity information of the first terminal and the identity information of the remote terminal, so that the group server verifies the remote terminal according to an identifier of the remote terminal, and after verifying the remote terminal, further determines whether the first terminal is a member of the communication group to which the remote terminal belongs. The second verification request message may be the same as or may be different from the first verification request message. When the two are different, the second verification request message may be obtained according to the first verification request message.

S506: The group server verifies the remote terminal according to the verification request message.

After the remote terminal is successfully verified according to the verification request message, the group server returns a verification response message to the remote terminal, to indicate that the verification performed on the remote terminal is successful. If the remote terminal is successfully verified, a subsequent process is executed; otherwise, the service process is terminated. Corresponding to the foregoing two cases of step S505, when the remote terminal sends the verification request message to the group server by means of forwarding by the first terminal, the verification response message may be directly sent to the remote terminal or be forwarded to the remote terminal by the first terminal; when the remote terminal sends the first verification request message to the first terminal, so that the first terminal sends the second verification request message to the group server according to the first verification request message, the group server sends a second verification response message to the first terminal, so that the first terminal sends a first verification response message to the remote terminal according to the second verification response message, to indicate that the verification performed on the remote terminal is successful. A process of returning a verification response message to the remote terminal by the group server is not shown in the figure.

Specifically, the group server performs verification on the remote terminal, so as to determine that the remote terminal belongs to the communication group.

It should be noted that after determining that the remote terminal belongs to the communication group, the group server may further perform verification on the first terminal to verify whether the first terminal can be used as the relay terminal of the communication group to which the remote terminal belongs. The verification process may be completed by the group server, or may be completed by a ProSe (Proximity Services, proximity services) server, which is not limited in this embodiment of the present invention.

S507: After determining that the remote terminal is successfully verified, the first terminal sends a group information request message to the remote terminal.

Specifically, after the first terminal determines, according to the second verification response message, that the remote terminal is successfully verified, or after receiving the verification response message and determining that the verification is successful, the remote terminal sends a notification message to the first terminal to notify the first terminal that the remote terminal is successfully verified. After determining that the remote terminal belongs to the communication group, the first terminal sends the group information request message to the remote terminal, so that the remote terminal sends group information of the communication group to the first terminal.

Further, the relay service request message includes identity information of the communication group. After receiving the relay service request message, the first terminal acquires the identity information of the communication group. The first terminal saves in advance identity information of a group to which the first terminal belongs, and when determining that the identity information of the communication group to which the remote terminal belongs is different from the identity information saved by the first terminal, determines that the first terminal does not belong to the communication group to which the remote terminal belongs; then the first terminal sends the group information request message to the remote terminal.

The group information includes communication resource information of the communication group, and may further include one or more of a MAC (Media Access Control, Media Access Control) address of the communication group, an IP address of the communication group, and security key information. The security key information is a security key used for group communication. The communication resource information refers to information about a frequency band for sending and receiving group data.

It should be noted that the identity information of the communication group to which the remote terminal belongs may be included in the relay terminal searching message broadcast by the remote terminal, or may be included in the relay service request message sent by the remote terminal, which is not limited in this embodiment of the present invention.

S508: The remote terminal sends the group information to the first terminal according to the group information request message.

Specifically, after receiving the group information request message sent by the first terminal, the remote terminal sends the group information to the first terminal according to the group information request message.

S509: The first terminal communicates with the remote terminal according to the group information.

Specifically, other steps of accessing, by the remote terminal, the network via the relay terminal are executed, and communication between the remote terminal and the network via the relay terminal is implemented according to obtained information. The group information includes the communication resource information. The first terminal may communicate with the remote terminal by using the communication resource information, and implement the communication between the remote terminal and the network by communicating with the remote terminal.

According to the foregoing solution, a first terminal receives a relay service request message sent by a remote terminal; and when determining that the first terminal is not a member of a communication group to which the remote terminal belongs, the first terminal acquires group information corresponding to the communication group, and communicates with the remote terminal according to the group information. In this way, when the first terminal and the remote terminal are not in a same communication group, the first terminal may acquire the group information from the remote terminal, and therefore communicate with a terminal of a different communication group.

It should be noted that, for the foregoing method embodiment, for ease of description, the method embodiment is expressed as a combination of a series of actions, but a person skilled in the art should know that the present invention is not limited to the described action sequence. Next, a person skilled in the art should also know that the embodiments described in the specification are exemplary embodiments and the involved actions and modules are not necessarily mandatory for the present invention.

Figure 6:
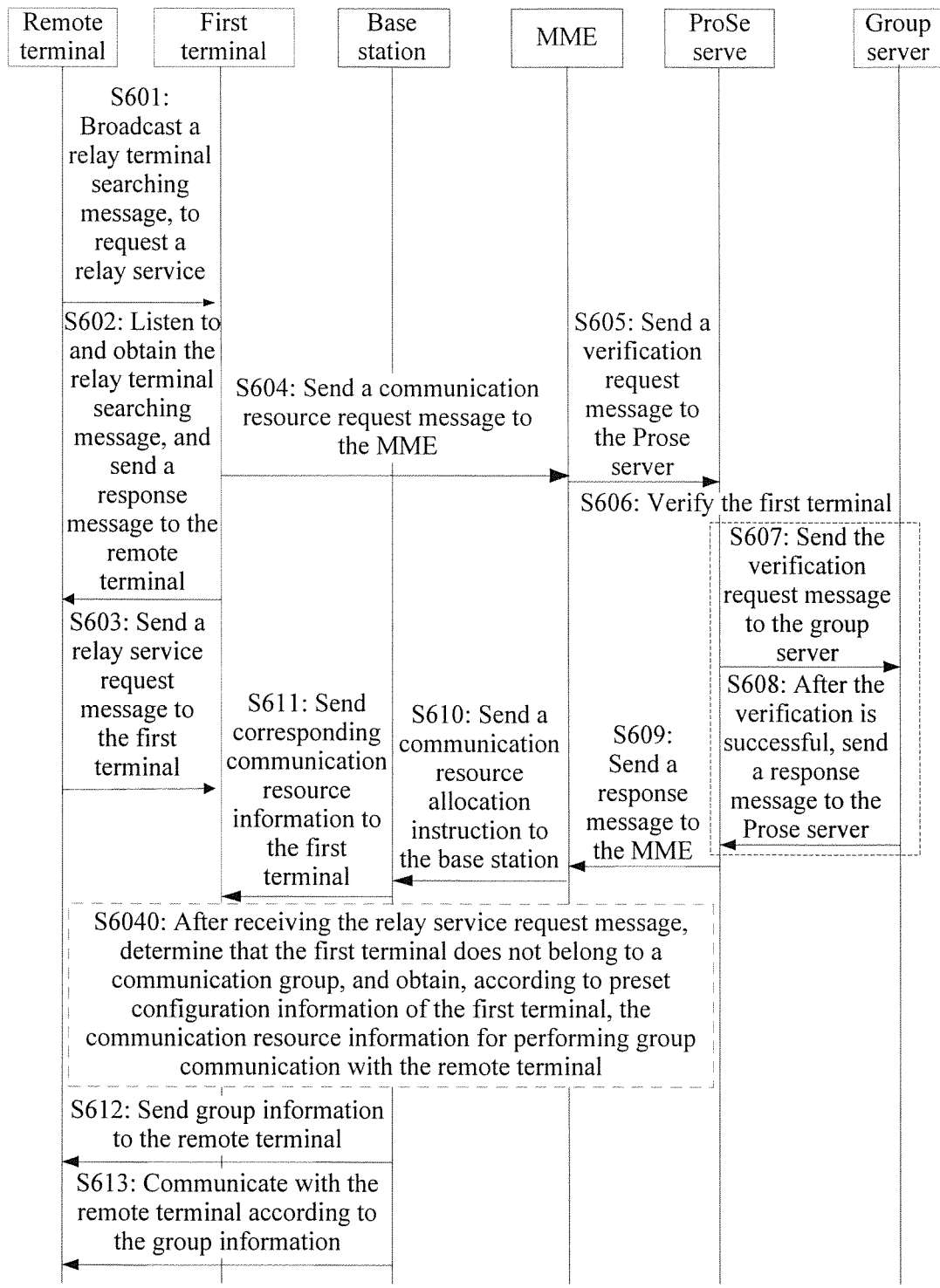
FIG. 6 is a schematic flowchart of another communication method according to an embodiment of the present invention.

An embodiment of the present invention provides a communication method. As shown in FIG. 6, the method includes:

S601: A remote terminal broadcasts a relay terminal searching message, to request a relay service.

The remote terminal loses network coverage, the remote terminal is a member of a communication group, and members of the communication group may communicate with each other in a group communication manner.

Specifically, the remote terminal loses the network coverage and cannot communicate with a network. Therefore, the remote terminal broadcasts a message, so as to search for a terminal within network coverage and use the terminal as a relay terminal.

S602: A first terminal listens to and obtains the relay terminal searching message, and sends a response message to the remote terminal.

The first terminal is within network coverage and can be used as a relay terminal.

Specifically, after receiving the relay terminal searching message sent by the remote terminal, the first terminal within network coverage sends the response message to the remote terminal, where the response message indicates that the first terminal can be used as the relay terminal.

It should be noted that "first", "second", and the like described in this embodiment of the present invention are not intended to limit a sequence and are merely for easy distinguishing.

S603: The remote terminal sends a relay service request message to the first terminal.

Specifically, after receiving at least one response message, if the remote terminal determines, according to a preset policy, to select the first terminal as the relay terminal, the remote terminal sends the relay service request message to the first terminal. The preset policy may be: selecting a terminal that is corresponding to a response message with largest signal strength in the at least one response message as the relay terminal. The relay service request message may be a notification including indication information of selecting the first terminal as the relay terminal, or may be a request message, sent by the remote terminal, for acquiring an IP (Internet Protocol, inter-network interconnection protocol) address, so as to notify the first terminal that the remote terminal has selected the first terminal as the relay terminal to perform a relay service. A specific type of the message is not limited in this embodiment of the present invention.

It should be noted that a process of selecting the first terminal as the relay terminal by the remote terminal may also be: sending a relay service request message to the first terminal if the remote terminal listens to and obtains a signal broadcast by at least one terminal within network coverage, and determines, according to the preset policy, to select the first terminal as the relay terminal, which is not limited in this embodiment of the present invention.

Further, after the first terminal receives the relay service request message, if the relay service request message includes identity information of the communication group, the first terminal acquires the identity information of the communication group. The first terminal saves in advance identity information of a group to which the first terminal belongs, and when determining that the identity information of the communication group to which the remote terminal belongs is different from the identity information saved by the first terminal, determines that the first terminal does not belong to the communication group to which the remote terminal belongs; then the first terminal acquires communication resource information for communication between the first terminal and the remote terminal. If the first terminal cannot specify the communication resource information according to preset configuration information of the first terminal, the following steps S604 to S611 are executed.

It should be noted that the identity information of the communication group to which the remote terminal belongs may be included in the relay terminal searching message broadcast by the remote terminal, or may be included in the relay service request message sent by the remote terminal, which is not limited in this embodiment of the present invention.

In addition, after executing the foregoing steps S601 to S603, the first terminal may further execute an IP address allocation process and a remote terminal verification process. Details are not described herein again, and reference may be made to the corresponding description in the foregoing embodiments.

S604: After receiving the relay service request message, if it is determined, according to the identity information, that the first terminal does not belong to the communication group, the first terminal sends a communication resource request message to an MME (Mobility Management Entity, mobility management entity).

Specifically, the communication resource request message may include an identifier of the communication group to which the remote terminal belongs and an identifier of the first terminal. The identifier of the communication group may be in a form of group ID (Identity, identity number) or in a form of group ID+APP (Application, application program) ID.

S605: The MME sends, according to the communication resource request message, a verification request message to a ProSe (Proximity Services, proximity services) server that serves the first terminal, to verify whether the first terminal can be used as a relay terminal for the communication group.

Further, the ProSe server may verify the first terminal according to subscription information saved in the ProSe server, or may instruct a home group server of the communication group to which the remote terminal belongs to verify the first terminal. If the ProSe server verifies the first terminal according to the subscription information, the following step S606 is executed.

S606: The ProSe server verifies the first terminal.

Specifically, the ProSe server may verify the first terminal based on the subscription information saved in the ProSe server.

Optionally, if the ProSe server requests the home group server of the remote terminal to verify the first terminal, the following steps S607 and S608 are executed.

S607: The ProSe server sends the verification request message to the group server.

Specifically, the resource request message sent by the first terminal to the MME includes identity information of the first terminal and the identity information of the communication group to which the remote terminal belongs, and the verification request message sent by the MME to the ProSe server includes the identity information of the first terminal and the identity information of the communication group to which the remote terminal belongs. Therefore, the ProSe server sends, to the group server, the verification request message including the identity information of the first terminal and the identity information of the communication group to which the remote terminal belongs.

S608: The group server verifies the first terminal, and after the verification is successful, sends a response message to the ProSe server.

Specifically, the group server verifies the first terminal based on group information, and after the verification is successful, sends the response message to the ProSe server. If the verification fails, a verification failure message is sent to the ProSe server.

S609: The ProSe server sends a response message to the MME.

Specifically, after successfully verifying the first terminal, or after receiving the response message sent by the group server, the ProSe server sends the response message to the MME, to notify the MME that the first terminal is successfully verified. If the verification fails, a verification failure message is sent to the MME.

S610: The MME sends a communication resource allocation instruction to a base station.

Specifically, after determining that the first terminal is successfully verified, the MME sends the communication resource allocation instruction to the base station, to instruct the base station to allocate a communication resource for communication between the first terminal and the remote terminal. The communication resource allocation instruction may be an initial context setup request (initial context setup request) message, where the initial context setup request message includes indication information of proximity services group communication.

S611: The base station allocates a communication resource according to the communication resource allocation instruction, and sends corresponding communication resource information to the first terminal.

Specifically, after receiving the communication resource allocation instruction sent by the MME, the base station allocates, according to the communication resource allocation instruction, the communication resource for communication between the first terminal and the remote terminal, and after allocating the communication resource, sends the communication resource information corresponding to the communication resource to the first terminal. The allocated communication resource information may be sent to the first terminal by using an RRC (Radio Resource Control, radio resource control protocol) connection reconfiguration message (RRC connection reconfiguration message).

Optionally, when the first terminal specifies the communication resource information according to the preset configuration information of the first terminal, the following step S6040 is executed.

S6040: After receiving the relay service request message, the first terminal determines that the first terminal does not belong to the communication group, and obtains, according to the preset configuration information of the first terminal, the communication resource information for performing group communication with the remote terminal.

Specifically, the first terminal may specify, according to the preset configuration information of the first terminal, the communication resource information for performing group communication with the remote terminal.

S612: The first terminal sends group information to the remote terminal.

Specifically, the group information includes the communication resource information specified by the first terminal or communication resource information of the communication group acquired from the network, and may further include a MAC (Media Access Control, Media Access Control) address, an IP address of the communication group, or security key information that is specified by the first terminal and required for group communication with the remote terminal. The first terminal may allocate the foregoing information based on preset configuration information. The security key information is a security key used for group communication. The communication resource information is information about a frequency band used for data communication.

S613: The first terminal communicates with the remote terminal according to the group information.

Specifically, the first terminal implements, according to the obtained group information, communication between the remote terminal and the network via the relay terminal. The group information includes the communication resource information. The first terminal may communicate with the remote terminal by using the communication resource information, and implement the communication between the remote terminal and the network by communicating with the remote terminal.

According to the foregoing solution, a first terminal receives a relay service request message sent by a remote terminal; and when determining that the first terminal is not a member of a communication group to which the remote terminal belongs, the first terminal specifies communication information or applies for a communication resources, so as to obtain group information, sends the group information to the remote terminal, and communicates with the remote terminal according to the group information. In this way, when the first terminal and the remote terminal are not in a same communication group, the first terminal may acquire group information from a network, and therefore communicate with a terminal of a different communication group.

It should be noted that, for the foregoing method embodiment, for ease of description, the method embodiment is expressed as a combination of a series of actions, but a person skilled in the art should know that the present invention is not limited to the described action sequence. Next, a person skilled in the art should also know that the embodiments described in the specification are exemplary embodiments and the involved actions and modules are not necessarily mandatory for the present invention.

Figure 7:
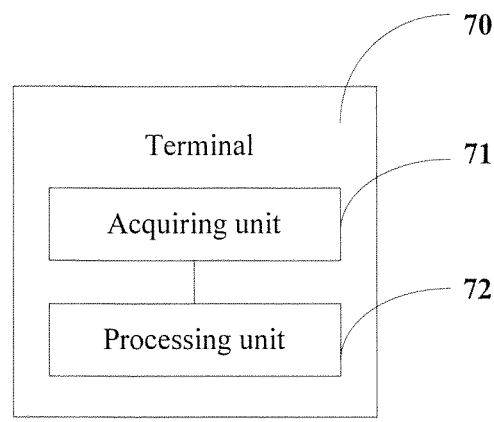
FIG. 7 is a schematic structural diagram of a terminal according to an embodiment of the present invention.

An embodiment of the present invention provides a terminal 70. As shown in FIG. 7, the terminal 70 includes:

an acquiring unit 71, configured to receive a first message sent by a second terminal; and when it is determined that the second terminal selects the terminal as a relay terminal, if the terminal is not a member of the communication group, acquire group information corresponding to the communication group, where the first message is used to request a relay service, the second terminal is a member of the communication group, and the terminal is a terminal having a relay function; and a processing unit 72, configured to communicate with the second terminal according to the group information obtained by the acquiring unit 71.

Specifically, if the second terminal loses network coverage, the second terminal sends the first message in a broadcast manner, so as to search for a terminal within network coverage and use the terminal as the relay terminal. The terminal receives the first message broadcast by the second terminal, where the terminal is within network coverage.

For example, the terminal is a mobile phone 1, and the second terminal is a mobile phone 2. If the mobile phone 2 cannot access a communications network due to a relatively weak signal, the mobile phone 2 sends a first message in a broadcast manner. The mobile phone 1 is within network coverage, and therefore can normally access the communications network. The mobile phone 1 receives the first message.

Optionally, the first message includes identity information of the communication group;

the processing unit 72 is further configured to determine, according to the identity information of the communication group, whether the terminal is a member of the communication group; and the acquiring unit 71 is specifically configured to: when the processing unit 72 determines that the terminal is not a member of the communication group, acquire the group information corresponding to the communication group.

Specifically, the first message includes the identity information of the communication group to which the second terminal belongs. The terminal may obtain the identity information of the communication group according to the received first message, acquire identity information of a home communication group of the terminal, and when determining that the identity information of the communication group to which the second terminal belongs is different from the identity information of the communication group to which the terminal belongs, determine that the terminal is not a member of the communication group.

Further, the terminal may request the group information from a home proximity services ProSe (Proximity Services, proximity services) server of the terminal, may request the group information from a home group server of the communication group, or may request the group information from an MME (Mobility Management Entity, mobility management entity).

Figure 8:
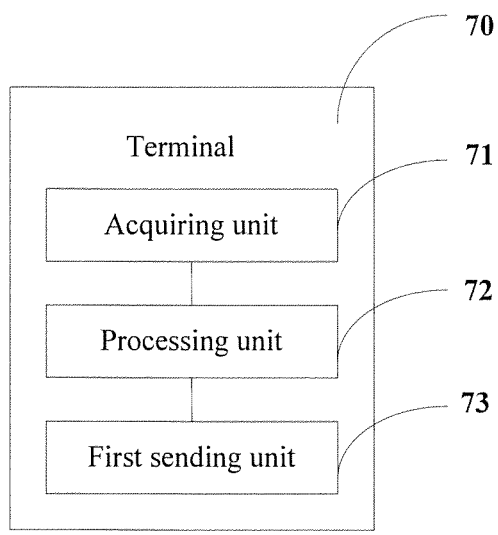
FIG. 8 is a schematic structural diagram of another terminal according to an embodiment of the present invention.

Optionally, as shown in FIG. 8, the terminal 70 further includes:

a first sending unit 73, configured to send a first request message including the identity information of the communication group to a ProSe server that serves the terminal, so that the ProSe server sends the group information corresponding to the communication group to the terminal according to the identity information of the communication group.

Further, after the terminal sends the first request message to the ProSe server, the ProSe server may verify, according to subscription information saved in the ProSe server, whether the terminal can be used as the relay terminal of the communication group to which the second terminal belongs; and if the verification fails, send a verification failure message to the terminal; or if the verification is successful, determine that the terminal can be used as the relay terminal of the second terminal, and send the group information to the terminal.

Specifically, after the verification performed by the ProSe server according to the subscription information saved in the ProSe server is successful, if the group information is configured in the ProSe server, the ProSe server may directly send the group information to the terminal.

Optionally, the first sending unit 73 is further configured to send the first request message including the identity information of the communication group to the ProSe server that serves the first terminal, so that the ProSe server sends, according to the first request message, a second request message to a group server of the communication group corresponding to the identity information of the communication group, and after receiving the group information that is sent by the group server to the ProSe server according to the second request message, sends the group information to the terminal.

The second request message is used to request the group information corresponding to the communication group.

Optionally, the terminal may send a third request message to the home group server of the communication group, so that the group server sends the group information to the terminal.

Optionally, that the acquiring unit 71 is configured to acquire group information corresponding to the communication group is specifically: the acquiring unit 71 is configured to receive the group information that is corresponding to the communication group and that is sent by a group server corresponding to the communication group.

Figure 9:
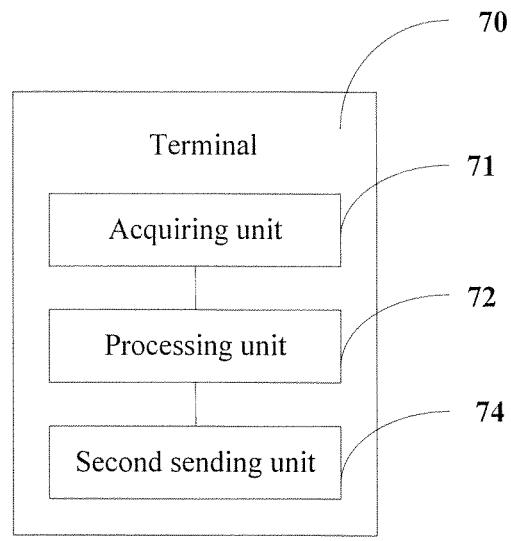
FIG. 9 is a schematic structural diagram of another terminal according to an embodiment of the present invention.

Further, as shown in FIG. 9, the terminal 70 further includes:

a second sending unit 74, configured to send a third request message to the home group server of the communication group, so that when determining that the terminal is not a member of the communication group, the group server sends the group information corresponding to the communication group to the terminal.

Figure 10:
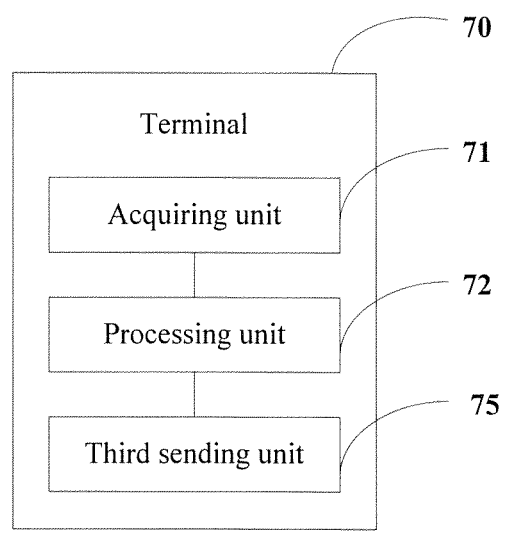
FIG. 10 is a schematic structural diagram of another terminal according to an embodiment of the present invention.

Optionally, as shown in FIG. 10, the acquiring unit 71 is further configured to receive a fourth request message sent by the second terminal.

The terminal 70 further includes a third sending unit 75, configured to: after the acquiring unit 71 receives the fourth request message sent by the second terminal, send, according to the fourth request message, a fifth request message to the group server corresponding to the communication group, so that when determining, according to the fifth request message, that the terminal is not a member of the communication group, the group server sends the group information corresponding to the communication group to the terminal.

The fifth request message includes identity information of the terminal.

It should be noted that the group information includes communication resource information of the communication group. In addition, the group information may further include a MAC (Media Access Control, Media Access Control) address of the communication group, an IP (Internet Protocol, inter-network interconnection protocol) address of the communication group, or security key information. The terminal may allocate the foregoing information based on preset configuration information. The security key information is a security key used for group communication. The communication resource information is information about a frequency band used for data communication.

Figure 11:
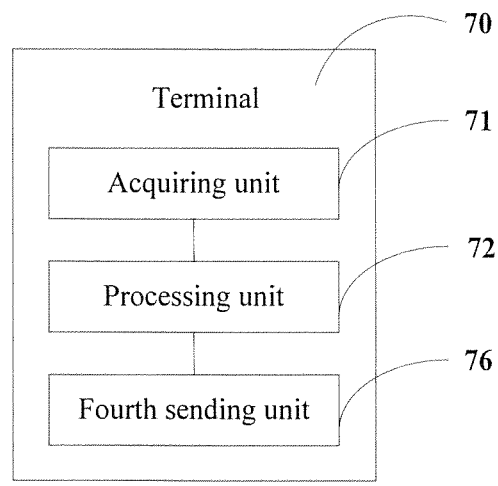
FIG. 11 is a schematic structural diagram of another terminal according to an embodiment of the present invention.

Optionally, as shown in FIG. 11, the group information corresponding to the communication group includes communication resource information.

The terminal 70 further includes a fourth sending unit 76, configured to send a sixth request message to a mobility management entity MME, so that the MME sends a seventh request message to a base station according to the sixth request message, to instruct the base station to allocate the communication resource information to the terminal.

That the acquiring unit 71 is configured to acquire group information corresponding to the communication group is specifically: the acquiring unit 71 is configured to receive the communication resource information allocated by the base station.

The fourth sending unit 76 is further configured to send the communication resource information to the second terminal.

That the processing unit 72 is configured to communicate with the second terminal according to the group information obtained by the acquiring unit 71 is specifically: the processing unit 72 is configured to communicate with the second terminal according to the communication resource information.

Specifically, after receiving the sixth request message, the MME verifies whether the terminal can be used as the relay terminal of the communication group to which the second terminal belongs. The MME may send a verification request message to the ProSe server, where the verification request message includes subscription information of the terminal, so that the ProSe server performs verification on the terminal.

Optionally, the MME may send a verification request message to a group server, where the verification request message includes identity information of the first terminal and the identity information of the communication group to which the second terminal belongs, so that the group server performs verification on the first terminal.

Specifically, after the verification is successful, the MME sends a resource allocation instruction to the base station, to instruct the base station to allocate a communication resource. The terminal receives the communication resource information sent by the base station, and sends the communication resource information to the second terminal.

Further, before the terminal communicates with the second terminal according to the group information, the terminal sends verification information to the second terminal, to verify the second terminal.

Specifically, the group information includes the verification information. The processing unit 72 is further configured to: after the acquiring unit acquires the group information corresponding to the communication group, generate the verification information or obtain the verification information according to the group information; verify the second terminal according to the verification information; and after the second terminal is successfully verified according to the verification information, communicate with the second terminal.

Further, after the second terminal is successfully verified, the terminal establishes communication with the second terminal according to the group information.

Specifically, the terminal may implement communication with the second terminal according to the communication resource information, and protect communication between the terminal and the second terminal according to the security key information.

Further, if the terminal can implement communication with the second terminal, the terminal can be used as the relay terminal, thereby implementing information exchange between the second terminal and a communications network.

According to the foregoing terminal, the terminal receives a first message sent by a second terminal, acquires group information corresponding to a communication group when determining that the terminal is not a member of the communication group, and communicates with the second terminal according to the group information. In this way, when the terminal and the second terminal are not in a same communication group, the terminal may apply to a network for a communication resource, and therefore communicate with a terminal of a different user group.

It may be clearly understood by a person skilled in the art that, for the purpose of convenient and brief description, for a specific working process and description of the terminal described above, reference may be made to the corresponding process in the foregoing method embodiments, and details are not described herein again.

Figure 12:
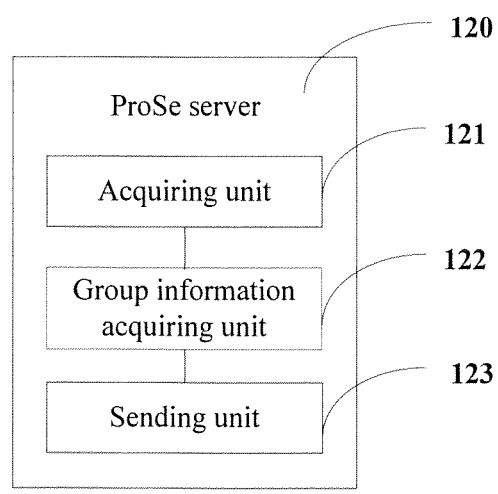
FIG. 12 is a schematic structural diagram of a ProSe server according to an embodiment of the present invention.

An embodiment of the present invention provides a proximity services ProSe (Proximity Services, proximity services) server 120. As shown in FIG. 12, the ProSe server 120 includes:

a receiving unit 121, configured to: after a first terminal receives a first message sent by a second terminal, receive a first request message sent by the first terminal, where the first message is used to request a relay service, the second terminal is a member of a communication group, the first message includes identity information of the communication group, and the first request message is used to instruct the ProSe server to send group information corresponding to the communication group to the first terminal;

a group information acquiring unit 122, configured to obtain, according to the first request message, the group information corresponding to the communication group; and a sending unit 123, configured to send the group information obtained by the group information acquiring unit 122 to the first terminal according to the first request message, so that the first terminal communicates with the second terminal according to the group information.

Specifically, if the second terminal loses network coverage, the second terminal sends the first message in a broadcast manner, so as to search for a terminal within network coverage and use the terminal as a relay terminal. After receiving the first message broadcast by the second terminal, the first terminal sends the first request message to the ProSe server, so that the ProSe server receives the first request message sent by the first terminal. The first terminal is within network coverage, and the first terminal is homed to the ProSe server.

Further, after the first terminal sends the first request message to the ProSe server, the ProSe server may verify, according to subscription information saved in the ProSe server, whether the first terminal can be used as the relay terminal of the communication group to which the second terminal belongs; and if the verification fails, send a verification failure message to the first terminal; or if the verification is successful, send the group information to the first terminal.

Specifically, after the first terminal is successfully verified by the ProSe server according to the subscription information, if the group information is configured in the ProSe server, the ProSe server may directly send the group information to the first terminal.

It should be noted that the group information includes communication resource information of the communication group. In addition, the group information may further include a MAC (Media Access Control, Media Access Control) address of the communication group, an IP (Internet Protocol, inter-network interconnection protocol) address of the communication group, or security key information. The first terminal may allocate the foregoing information based on preset configuration information. The security key information is a security key used for group communication. The communication resource information is information about a frequency band used for data communication.

Optionally, the sending unit 123 is specifically configured to send a second request message to a home group server of the home communication group of the second terminal according to the first request message, so that the group server sends the group information to the ProSe server.

The group information acquiring unit 122 is specifically configured to receive the group information sent by the group server.

The sending unit 123 is specifically configured to send the group information received by the group information acquiring unit 122 to the first terminal.

Specifically, after the verification performed by the ProSe server according to the subscription information saved in the ProSe server is successful, if no group information is saved in the ProSe server, the ProSe server sends a second request to the home group server of the communication group according to the first request message, and after receiving the group information that is sent by the group server to the ProSe server according to the second request, sends the group information to the first terminal.

According to the foregoing ProSe server, when a first terminal and a second terminal are not in a same communication group, the first terminal may apply to a network for a communication resource, and therefore communicate with a terminal of a different user group.

It may be clearly understood by a person skilled in the art that, for the purpose of convenient and brief description, for a specific working process and description of the ProSe server described above, reference may be made to the corresponding process in the foregoing method embodiments, and details are not described herein again.

Figure 13:
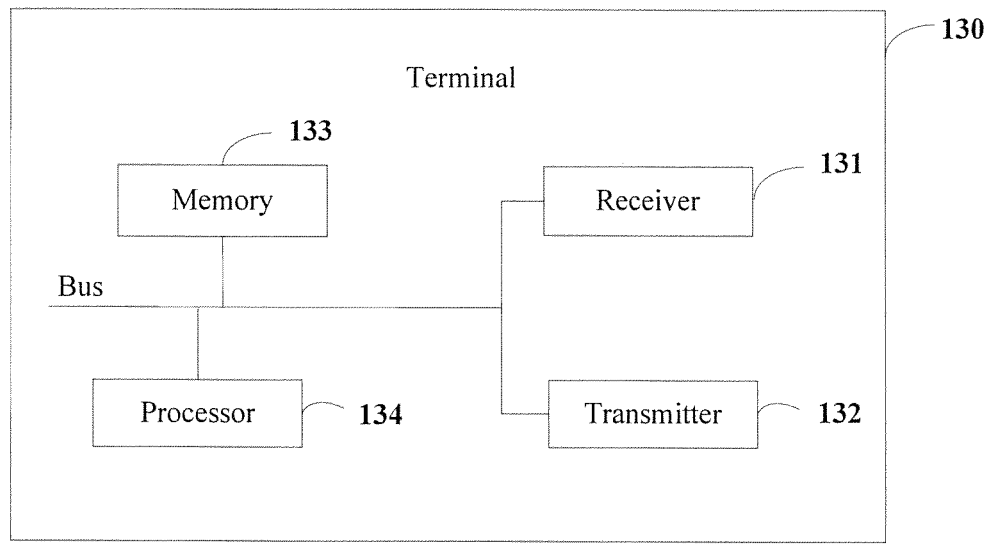
FIG. 13 is a schematic structural diagram of another terminal according to an embodiment of the present invention.

An embodiment of the present invention provides a terminal 130. As shown in FIG. 13, the terminal 130 includes:

a receiver 131, a transmitter 132, a memory 133, and a processor 134 (there may be one or more processors 134 in this device, and in FIG. 13, one processor is used as an example), where in some embodiments of the present invention, the receiver 131, the transmitter 132, the memory 133, and the processor 134 may be connected by using a bus or in another manner, and in FIG. 13, that a bus is used for connection is used as an example.

The memory 133 is configured to store program code. The processor 134 is configured to invoke the program code stored in the memory 133 to execute the following steps:

receiving, by using the receiver 131, a first message sent by a second terminal, and when determining that the second terminal selects the terminal as a relay terminal, if the terminal is not a member of a communication group, acquiring group information corresponding to the communication group, where the first message is used to request a relay service, the second terminal is a member of the communication group, and the terminal is a terminal having a relay function; and communicating, by the processor 134 according to the group information, with the second terminal by using the receiver 131 and the transmitter 132.

Optionally, the first message includes identity information of the communication group. The processor 134 determines, according to the identity information of the communication group, whether the terminal is a member of the communication group; and when determining that the terminal is not a member of the communication group, acquires the group information corresponding to the communication group by using the receiver 131.

Further, the processor 134 sends, by using the transmitter 132, a first request message including the identity information of the communication group to a proximity services ProSe server that serves the terminal, so that the ProSe server sends the group information corresponding to the communication group to the terminal according to the identity information of the communication group.

Further, the processor 134 sends, by using the transmitter 132, the first request message including the identity information of the communication group to the ProSe server that serves the terminal, so that the ProSe server sends, according to the first request message, a second request message to a group server of the communication group corresponding to the identity information of the communication group, and after receiving the group information that is sent by the group server to the ProSe server according to the second request message, sends the group information to the terminal, where the second request message is used to request the group information corresponding to the communication group.

Optionally, the processor 134 receives, by using the receiver 131, the group information that is corresponding to the communication group and that is sent by a group server corresponding to the communication group.

Further, the processor 134 sends a third request message to the home group server of the communication group by using the transmitter 132, so that when determining that the terminal is not a member of the communication group, the group server sends the group information corresponding to the communication group to the terminal.

Optionally, before the processor 134 receives, by using the receiver 131, the group information that is corresponding to the communication group and that is sent by the group server corresponding to the communication group, after receiving, by using the receiver 131, a fourth request message sent by the second terminal, the processor 134 sends, by using the transmitter 132 according to the fourth request message, a fifth request message to the group server corresponding to the communication group, so that when determining, according to the fifth request message, that the terminal is not a member of the communication group, the group server sends the group information corresponding to the communication group to the terminal, where the fifth request message includes identity information of the terminal.

Specifically, the group information includes communication resource information of the communication group.

Optionally, the group information further includes at least one of a MAC (Media Access Control, Media Access Control) address of the communication group, an IP (Internet Protocol, inter-network interconnection protocol) address of the communication group, and security key information.

Optionally, the group information corresponding to the communication group includes communication resource information. Before the processor 134 acquires, by using the receiver 131, the group information corresponding to the communication group, the processor 134 further executes: sending a sixth request message to a mobility management entity MME by using the transmitter 132, so that the MME sends a seventh request message to a base station according to the sixth request message, to instruct the base station to allocate the communication resource information to the terminal; receiving, by using the receiver 131, the communication resource information allocated by the base station; sending the communication resource information to the second terminal by using the transmitter 132; and communicating, by the processor 134 according to the communication resource information, with the second terminal by using the receiver 131 and the transmitter 132.

Optionally, the group information further includes verification information. After the processor 134 acquires, by using the receiver 131, the group information corresponding to the communication group, the processor 134 generates the verification information or obtains the verification information according to the group information, and verifies the second terminal according to the verification information. After the second terminal is successfully verified according to the verification information, the processor 134 communicates with the second terminal by using the receiver 131 and the transmitter 132.

It may be clearly understood by a person skilled in the art that, for the purpose of convenient and brief description, for a specific working process and description of the terminal 130 described above, reference may be made to the corresponding process in the foregoing method embodiments, and details are not described herein again.

Figure 14:
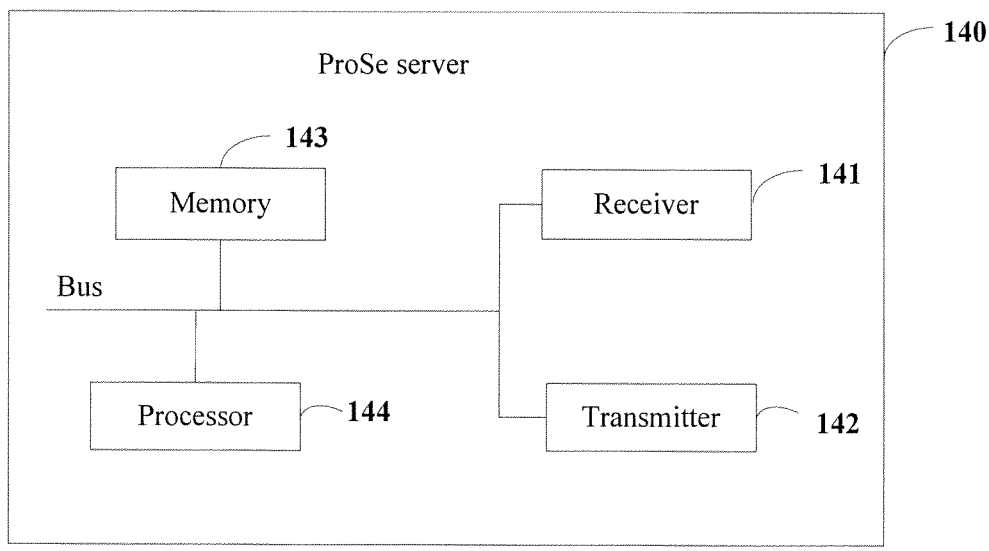
FIG. 14 is a schematic structural diagram of another ProSe server according to an embodiment of the present invention.

An embodiment of the present invention provides a ProSe (Proximity Services, proximity services) server 140. As shown in FIG. 14, the ProSe server includes:

a receiver 141, a transmitter 142, a memory 143, and a processor 144 (there may be one or more processors 144 in this device, and in FIG. 14, one processor is used as an example), where in some embodiments of the present invention, the receiver 141, the transmitter 142, the memory 143, and the processor 144 may be connected by using a bus or in another manner, and in FIG. 14, that a bus is used for connection is used as an example.

The memory 143 is configured to store program code. The processor 144 is configured to invoke the program code stored in the memory 143 to execute the following steps:

after a first terminal receives a first message sent by a second terminal, receiving, by using the receiver 141, a first request message sent by the first terminal; and sending, by using the transmitter 142, group information to the first terminal according to the first request message, so that the first terminal communicates with the second terminal according to the group information, where the first message is used to request a relay service, the second terminal is a member of a communication group, the first message includes identity information of the communication group, and the first request message is used to instruct the ProSe server to send the group information corresponding to the communication group to the first terminal.

Further, the processor 144 sends, by using the transmitter 142 according to the first request message, a second request message to a home group server of the communication group to which the second terminal belongs, so that the group server sends the group information to the ProSe server; receives, by using the receiver 141, the group information sent by the group server; and sends the group information to the first terminal by using the transmitter 142.

Specifically, the group information includes communication resource information of the communication group.

Optionally, the group information further includes at least one of a Media Access Control MAC address of the communication group, an inter-network interconnection protocol IP address of the communication group, and security key information.

It may be clearly understood by a person skilled in the art that, for the purpose of convenient and brief description, for a specific working process and description of the ProSe server 140 described above, reference may be made to the corresponding process in the foregoing method embodiments, and details are not described herein again.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   receiving, by a first terminal, a first message sent by a second terminal, wherein the first message is for requesting a relay service, the second terminal is a member of a communication group, the first terminal is a terminal having a relay function, and the first message comprises identity information of the communication group;
   when the first terminal determines that the second terminal selects the first terminal as a relay terminal, and when the first terminal is not a member of the communication group, sending, by the first terminal, a first request message comprising the identity information of the communication group to a proximity services (ProSe) server that serves the first terminal and acquiring, from the ProSe server in response to the first request message, group information corresponding to the communication group; and communicating, by the first terminal, with the second terminal according to the group information.

2. The method according to claim 1,
before acquiring, from the ProSe server in response to the first request message, the group information corresponding to the communication group, the method further comprises:
determining, by the first terminal according to the identity information of the communication group, whether the first terminal is a member of the communication group; and
acquiring, from the ProSe server in response to the first request message, the group information corresponding to the communication group comprises:
when determining that the first terminal is not a member of the communication group, acquiring, from the ProSe server in response to the first request message, the group information corresponding to the communication group.

3. The method according to claim 2, wherein sending, by the first terminal, the first request message comprising the identity information of the communication group to the proximity services ProSe server that serves the first terminal comprises:
sending, by the first terminal, the first request message comprising the identity information of the communication group to the ProSe server that serves the first terminal, the first request message for enabling the ProSe server to send, according to the first request message, a second request message to a group server of the communication group corresponding to the identity information of the communication group, and after receiving the group information that is sent by the group server to the ProSe server according to the second request message, send the group information to the first terminal, wherein the second request message is for requesting the group information corresponding to the communication group.

4. The method according to claim 1, wherein the group information further comprises verification information;
after acquiring, from the ProSe server in response to the first request message, the group information corresponding to the communication group, the method further comprises:
generating, by the first terminal, the verification information or obtaining the verification information according to the group information, and verifying the second terminal according to the verification information; and
communicating, by the first terminal, with the second terminal according to the group information comprises:
after the second terminal is successfully verified according to the verification information, communicating, by the first terminal, with the second terminal.

5. A communication method, comprising:
after a first terminal receives a first message sent by a second terminal, receiving, by a proximity services (ProSe) server, a first request message sent by the first terminal, wherein the first message is for requesting a relay service, the second terminal is a member of a communication group, the first message comprises identity information of the communication group, and the first request message is for instructing the ProSe server to send group information corresponding to the communication group to the first terminal; and
sending the group information to the first terminal according to the first request message, the group information for enabling the first terminal to communicate with the second terminal according to the group information.

6. The method according to claim 5, wherein sending the group information to the first terminal according to the first request message comprises:
sending, according to the first request message, a second request message to a home group server of the communication group to which the second terminal belongs, the second request message for requesting the home group server to send the group information to the ProSe server; and
receiving the group information sent by the home group server, and sending the group information to the first terminal.

7. A terminal, comprising:
at least one processor configured to:
receive a first message sent by a second terminal wherein the first message is for requesting a relay service, the second terminal is a member of a communication group, the terminal is a terminal having a relay function, and the first message comprises identity information of the communication group;
when it is determined that the second terminal selects the terminal as a relay terminal, and when the terminal is not a member of a communication group, send a first request message comprising the identity information of the communication group to a proximity services (ProSe) server that serves the terminal and acquire, from the ProSe server in response to the first request message, group information corresponding to the communication group; and
communicate with the second terminal according to the group information.

8. The terminal according to claim 7, wherein the at least one processor is further configured to:
determine, according to the identity information of the communication group, whether the terminal is a member of the communication group; and
in response to a determination that the terminal is not a member of the communication group, acquire the group information corresponding to the communication group.

9. The terminal according to claim 8, further comprising:
a transmitter configured to send the first request message comprising the identity information of the communication group to the ProSe server that serves the terminal, the first request message for enabling the ProSe server to send, according to the first request message, a second request message to a group server of the communication group corresponding to the identity information of the communication group, and after receiving the group information that is sent by the group server to the ProSe server according to the second request message, send the group information to the terminal, wherein the second request message is for requesting the group information corresponding to the communication group.

10. A proximity services ProSe server, comprising:
a receiver configured to: after a first terminal receives a first message sent by a second terminal, receive a first request message sent by the first terminal, wherein the first message is for requesting a relay service, the second terminal is a member of a communication group, the first message comprises identity information of the communication group, and the first request message is for instructing the ProSe server to send group information corresponding to the communication group to the first terminal;

at least one processor configured to obtain, according to the first request message, the group information corresponding to the communication group; and a transmitter configured to send the group information to the first terminal according to the first request message, the group information for enabling the first terminal to communicate with the second terminal according to the group information.

11. The ProSe server according to claim 10, wherein:

the transmitter is configured to send a second request message to a home group server of the communication group of the second terminal according to the first request message, the second request message for requesting the home group server to send the group information to the ProSe server;

the receiver is configured to receive the group information sent by the home group server; and the transmitter is further configured to send the group information received by the group information acquiring unit to the first terminal.

* * * * *